(12) United States Patent
Vörös

(10) Patent No.: US 10,288,139 B2
(45) Date of Patent: May 14, 2019

(54) WOODEN SPRING AND MATTRESS MANUFACTURED WITH WOODEN SPRINGS

(71) Applicant: Gabor Vörös, Gyor-Gyirmot (HU)

(72) Inventor: Gabor Vörös, Gyor-Gyirmot (HU)

( * ) Notice: Subject to any disclaimer, the term of this patent is extended or adjusted under 35 U.S.C. 154(b) by 541 days.

(21) Appl. No.: 14/601,433

(22) Filed: Jan. 21, 2015

(65) Prior Publication Data

US 2015/0226278 A1 Aug. 13, 2015

Related U.S. Application Data

(60) Provisional application No. 61/930,248, filed on Jan. 22, 2014.

(51) Int. Cl.
| | | |
|---|---|---|
| *F16F 1/364* | (2006.01) |
| *A47C 23/043* | (2006.01) |
| *A47C 27/06* | (2006.01) |
| *A47C 23/04* | (2006.01) |
| *A47C 27/20* | (2006.01) |
| *B27H 1/00* | (2006.01) |
| *F16F 3/087* | (2006.01) |

(52) U.S. Cl.
CPC .............. *F16F 1/364* (2013.01); *A47C 23/04* (2013.01); *A47C 23/0438* (2013.01); *A47C 27/062* (2013.01); *A47C 27/064* (2013.01); *A47C 27/065* (2013.01); *A47C 27/20* (2013.01); *B27H 1/00* (2013.01); *F16F 3/0876* (2013.01)

(58) Field of Classification Search
CPC ... A47C 23/04; A47C 23/043; A47C 23/0433; A47C 23/0438; A47C 27/04; A47C 27/06; A47C 27/062; F16F 1/04; F16F 1/047; F16F 1/06; F16F 1/364; F16F 3/00; F16F 3/04
USPC ......... 5/716, 248, 256; 267/91, 93, 103, 166
See application file for complete search history.

(56) References Cited

U.S. PATENT DOCUMENTS

| | | | | |
|---|---|---|---|---|
| 380,651 | A * | 4/1888 | Fowler et al. ............. | F16F 1/08 267/166.1 |
| 1,963,054 | A * | 6/1934 | Powers .............. | A47C 23/0438 267/286 |
| 1,963,055 | A * | 6/1934 | Powers .............. | A47C 23/0438 267/286 |
| 3,626,523 | A * | 12/1971 | Robins ................. | A47C 27/062 5/716 |
| 4,052,760 | A * | 10/1977 | Golembeck ........ | A47C 23/0433 5/248 |
| 4,111,407 | A * | 9/1978 | Stager ...................... | F16F 1/08 267/166 |

(Continued)

FOREIGN PATENT DOCUMENTS

| | | | | |
|---|---|---|---|---|
| EP | 1048248 A1 * | 11/2000 | ........... | A47C 27/064 |
| EP | 2002759 A1 * | 12/2008 | ........... | A47C 27/065 |

*Primary Examiner* — Robert G Santos
(74) *Attorney, Agent, or Firm* — Ostrolenk Faber LLP

(57) ABSTRACT

Described are wooden coil springs, including those made of non-compressed wood, and mattresses with such coil springs. Also described is a method of producing a coil spring made of non-compressed wood, which includes winding a slat on reel, steaming and drying to produce the wooden coil spring. Such a coil spring may have a cylindrical shape, a cone shape or a truncated cone shape, and may have a substantially perpendicular end turn with respect to the longitudinal axis of the coil spring.

18 Claims, 22 Drawing Sheets

(56) References Cited

U.S. PATENT DOCUMENTS

| | | | | |
|---|---|---|---|---|
| 4,161,046 A * | 7/1979 | Golembeck | A47C 23/0433 | 5/248 |
| 4,679,266 A * | 7/1987 | Kraft | A47C 23/0433 | 5/716 |
| 5,596,777 A * | 1/1997 | Polus | A47C 23/04 | 5/256 |
| 5,868,383 A * | 2/1999 | Codos | B68G 9/00 | 267/166.1 |
| 6,170,807 B1 * | 1/2001 | Eto | A47C 27/062 | 267/103 |
| 6,353,952 B1 * | 3/2002 | Wells | A47C 27/062 | 5/716 |
| 6,540,214 B2 * | 4/2003 | Barber | F16F 3/04 | 267/93 |
| 7,731,562 B2 * | 6/2010 | Huber | A63H 33/00 | 267/166 |
| 2008/0064297 A1 * | 3/2008 | Huber | A63H 33/00 | 446/486 |
| 2015/0226278 A1 * | 8/2015 | Voros | A47C 23/0438 | 5/716 |

\* cited by examiner

WOODEN SPRING AND MATTRESS MANUFACTURED WITH WOODEN SPRINGS

CROSS-REFERENCE TO RELATED APPLICATION

The present non-provisional patent application claims the benefit of priority from U.S. Provisional Patent Application No. 61/930,248, filed Jan. 22, 2014, the entire contents of which are incorporated herein by reference.

FIELD OF THE INVENTION

The present disclosure relates to the field of wooden coil springs, including non-compressed wood coil springs, and to mattresses made from such wooden coil springs.

BACKGROUND

Mattresses typically use springs, such as helical coil springs made of metal, to provide support for the body, and to provide a degree of alignment for the spine and a springy and comfortable feel for the user of the mattress. Helical coil springs or compression springs absorb the weight of a person and provide support, including support for the hips, spine and shoulders.

Designs and methods for producing a mattress having embedded springs are well known. See, for example, U.S. Pat. No. 4,154,786 (Plasse). Pocket spring technology in which springs are separated from one another by a material, such as a fabric material, are also known see, for example, U.S. Patent Application Publication No. 2004/0025257 (Ahlqvist) and U.S. Patent Application Publication No. 2005/0257323 (Edling). The contents of U.S. Pat. No. 4,154,786 and of U.S. Patent Application Publication Nos. 2004/0025257 and 2005/0257323 are incorporated in full by reference herein.

People are concerned with electric and magnetic fields induced by steel or other metal coils inside a mattress, especially since they spend a third or more of their lives on or near the mattress. Some studies have shown the deleterious effects for blood circulation, and other adverse physiological effects, caused by such electrostatic noise induced in or by metal coils. The effects of such fields and noise on human health and brain functioning are not fully understood at the present time.

There is thus a need for alternative types of mattresses that use more organic material-based compression coils. In addition, wooden coil springs may have a longer useful life, and may reduce or eliminate audible noises from the mattress.

Rattan, reed and other types of cane have been used to provide support and comfort for a person lying or sitting. For example, U.S. Pat. No. 5,596,777 (Polus), the content of which is incorporated in full by reference herein, describes such a solution. However, rattan springs typically require a stabilizing or hardening frame.

Compression springs made of compressed wood are known. For example, EP 2002759 (Czel), filed Jun. 15, 2007, the content of which is incorporated in full by reference herein, describes an energy storing compression spring made of compressed wood.

Wood can be compressed before it is bent. This is usually done on a wood pressing or compressing machine, and the wood is typically left in the machine for many hours. If the compressing is successful, the fibers of the wood have shifted in position and the wood becomes flexible and bendable even in the cold state. This is sometimes known as cold bending.

An advantage of using non-compressed wood, however, is that it may require fewer processing steps or shorter processing time to produce the coils. Also, non-compressed wood processing allows for greater control of the size, including the length and cross-section, of the slat that is formed into the coil, and greater control over the orientation and position of the last turns of the coil, and thus greater control over the size of the end turns of the coil. In addition, compressing wood can change the internal wood fibers such that the wood becomes more difficult to shape and sand. Compressed wood can tear or rip more easily when it is chiseled or sanded, or chunks of the wood can thus become loose.

Compressed wood loses up to 20% or more of its original length. Since a piece of wood to be made into a coil must be knot-free, the presence of knots in the wood limits the maximum length of a piece of wood that is usable for making a coil. Therefore, the length of coil springs that can be made of compressed wood is shorter than it would be if the wood did not have to be compressed. In addition, wood compressing machines are expensive, the compression process takes many hours and consumes significant energy, and the lack of availability of compression machines in sufficient quantities limits the amount of wooden springs that can be produced. In addition, wood that is not freshly cut can become deformed during compression. Thus, wood to be compressed should be obtained early in the season, for example, by spring or by April. Such wood must be stored in a careful way after its compressed and must be used within a relatively short time, such as within 6-9 months after compression. Compressed wood that is stored for longer periods often does not stand up to the requirements for wooden springs or even for other uses, or may produce inferior quality products. Wood can store moisture between its grains or inside its plant cells. Wood that is stored for a prolonged period of time can tend to dry, which is a result of water leaving the cells. If the wood is left for a longer period, then continued drying of the wood will affects its mechanical properties, as the wood begins to shrink and to get harder. Once wood becomes dry after prolonged storage, its moisture cannot be reliably restored before compression. Compressing such wood can deform the wood in undesirable ways and such wood can yield an inferior product after compression.

A process of producing wooden springs from compressed wood also involves steaming or warming and then drying of the wood. In fact, in the case of the manufacture of wooden springs, repeated drying may be necessary. These very energy intensive steps are not necessarily required for the production of wooden springs from non-compressed wood. Thus, the same amount of raw material will yield a greater amount of product for non-compressed wood, a smaller carbon footprint may be achieved using non-compressed wood processing, and a less costly process involving reduced need for energy may be obtained for the production of wooden springs using non-compressed wood processing. Also, longer wooden springs may thus be obtained.

Compression of the wood results in a spring with greater spring bias or greater spring force. This is caused by the greater stresses in the wood caused by the compression. This compression, however, may create a greater, stronger spring that is capable of working harder longer. This spring force cannot be decreased beyond a certain minimum force for any given spring height. Thus, a softer, less firm feeling spring can be generated with coil spring made from non-compressed wood.

Non-compressed wood, since it requires fewer processing steps than wood that is subjected to heavy pressure and compression, may be described as a more "natural," less processed wood product, and marketed as such.

It has been found, however, that non-compressed wood is also bendable if steamed, in a process sometimes known as the Thonet process. While the Thonet process is known, the following description provides, among other things, a new method for using non-compressed wood to make wooden spring coils.

SUMMARY OF THE DISCLOSURE

Described are wooden coil springs, including those made of non-compressed wood, and mattresses with such coil springs. Also a method of producing a coil spring made of non-compressed wood is described. Such a method includes:
wrapping a slat of wood on a reel and securing the slat on the reel to form the coil spring from the slat;
steaming the coil spring on the reel;
drying the coil spring; and
shaping an end turn of the coil spring.

According to this method, the drying may be performed with the coil spring on the reel without removing the coil spring from the reel before the drying.

The wrapping and securing the slat may include securing a first end of the slat on the reel, winding the slat around the reel, and clinching the second end of the slat. The wrapping of the slat may include winding the slat around the reel at least two times. The wrapping of the slat may include positioning, as a guide reel, a second reel to guide the slat.

The drying may include irradiating the coil spring.

The coil spring can have a longitudinal axis, and the shaping of the end turn may include:
positioning a spacer at an outer major surface of the end turn, the outer major surface being transverse to the longitudinal axis, the spacer positioned substantially perpendicular to a longitudinal axis of the coil spring, such that the spacer prevents movement of the coil spring along the longitudinal axis toward the spacer; and
positioning a device immediately adjacent an end of the end turn, such that the device prevents movement of the end of the end turn in a circumferential direction with respect to the longitudinal axis.

The coil spring may have a cylindrical shape. The reel may also have a cylindrical shape. The coil spring may have a cone or truncated cone shape. The reel may have a cone or truncated cone shape. The coil spring may have at least three turns, each turn having a diameter smaller than an immediately adjacent turn.

The end turn may have a diameter substantially equal to the immediately adjacent turn.

According to such a method, the shaping of the end turn may include:
configuring the end turn such that an outer surface of the end turn facing away from any adjacent turn of the coil spring is substantially perpendicular, for at least 180 degrees of the end turn, to the longitudinal axis of the coil spring.

The shaping of the end turn may include joining and securing together at least two turns of the coil spring to form the end turn. Further, the shaping of the end turn may include decreasing a thickness of the end turn, the thickness being a shortest dimension of the slat that forms the coil spring. The shaping of the end turn may include decreasing a width of the end turn, the width being a dimension of the slat that forms the coil spring greater than a thickness of the slat but smaller than a length of the slat.

Also, a wooden coil spring produced according to this method, and mattress including such a wooden coil are disclosed. A support pad, for example, for a sofa, chaise, lounge chair, chair or other supporting surface made of a wooden coil spring produced according to this method are also contemplated.

Also disclosed is a wooden coil spring made of a slat of wood having a first thickness at a first point in a longitudinal direction different from a second thickness at a second point of the slat in the longitudinal direction. Such a wooden coil spring may be made of non-compressed wood.

Such a coil spring may have a cylindrical shape, a cone shape or a truncated cone shape. Such a coil spring may include at least three turns, each turn having a diameter smaller than an immediately adjacent turn. An outer surface of the end turn facing away from any adjacent turn of such a coil spring may be substantially perpendicular, for at least 180 degrees of the end turn, to the longitudinal axis of the coil spring.

Such a coil spring may have a helical rise in a range of 3-45 degrees.

Also described is a mattress that includes such a coil spring.

Further described is a mattress that includes:
a core layer that includes a first plurality of wooden coil springs made of non-compressed wood positioned at a first area of the mattress, and a second plurality of wooden coil springs made of non-compressed wood positioned at a second area of the mattress different from the first area, wherein the first plurality of wooden coil springs provides a firmness firmer than the firmness of the second plurality of wooden coil springs.

In such a mattress, first area of the mattress may correspond to an area for receiving a human hip region of a human body lying on the mattress. For example, the first plurality of wooden coil springs may include coil springs shorter than coil springs of the second plurality of wooden coil springs. The first plurality of wooden coil springs may include coil springs each with an end turn thicker than end turns of the coil springs of the second plurality of wooden coil springs. The first plurality of wooden coil springs may include coil springs each with a course of compression shorter than the course of compression of each of the coil springs of the second plurality of wooden coil springs.

In such a mattress, the core layer may include a plurality of recesses, each recess sized and positioned to receive a wooden coil spring of the first plurality of wooden coil springs and the second plurality of wooden coil springs.

The wooden coil springs of such a mattress may include wooden coil springs of cylindrical shape. The second plurality of wooden coil springs may include coil springs of cone or truncated cone shape.

The wooden coil springs of such a mattress may include coil springs of cone or truncated cone shape positioned such that a narrower end of the cone or truncated cone faces toward a top of the mattress. In such a mattress, some wooden coil springs may be of cylindrical shape and some wooden coil springs may be of cone or truncated cone shape.

In such a mattress, a wooden coil spring may have an end turn with a smaller width than remaining turns of the wooden coil spring.

In such a mattress, the end turn may have a major outer surface facing away from any adjacent turn of the wooden coil spring and substantially perpendicular, for at least 180 degrees of the end turn, to the longitudinal axis of the wooden coil spring.

In such a mattress, the first plurality of wooden coil springs may be positioned in a first insert, and the second plurality of wooden coil springs may be positioned in a second insert, the first and second inserts positioned in the core layer. The core layer may include at least three inserts, each insert positioned to correspond to a different region of a human body lying on the mattress. For example, at least one of the inserts may have a first wooden coil spring providing a first firmness, and a second wooden coil spring providing a second firmness firmer than the first firmness.

In such a mattress, each spring of the first plurality of wooden coil springs and the second plurality of wooden coil springs may be positioned in a separate pocket. A stabilizing layer may also be positioned in the mattress parallel to the core layer,
wherein each coil spring of the first plurality of wooden coil springs and the second plurality of wooden coil springs is secured to the stabilizing layer.

In such a mattress, the wooden coil spring may be formed of a slat, and a width of the slat at a first portion of the wooden coil spring that corresponds to an end turn of the wooden coil spring may be smaller than widths of the slat corresponding to remaining turns of the wooden coil spring, the width being a dimension of the slat greater than a thickness of the slat but smaller than a length of the slat.

DETAILED DESCRIPTION OF THE EMBODIMENTS

Figure 1:
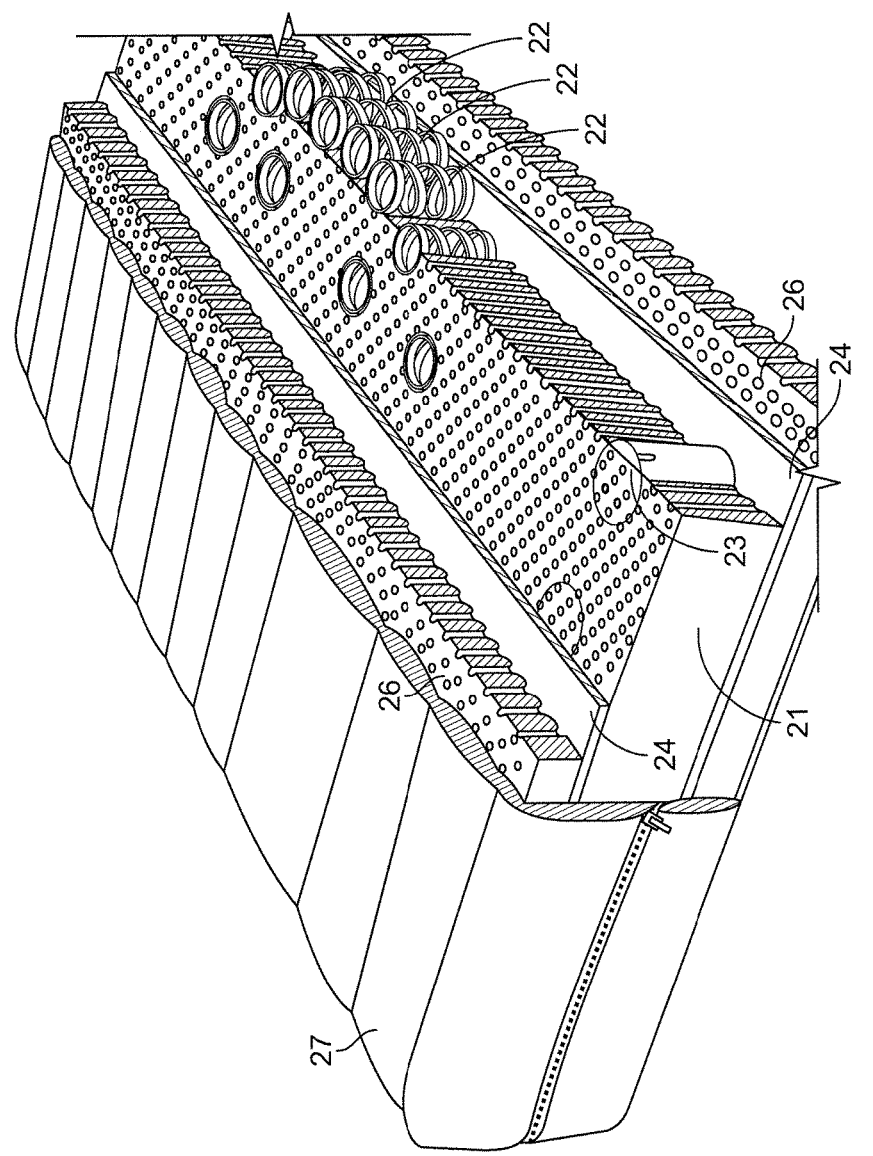
FIG. 1 is a perspective view illustrating an example of a mattress with a core layer including non-compressed wooden springs, according to an aspect of the present disclosure.

Mattresses typically use springs, such as helical coil springs made of metal, to provide support for the body, and to provide a degree of alignment for the spine and a springy and comfortable feel for the user of the mattress. Helical coil springs or compression springs absorb the weight of a person and provide support, including support for the hips, spine and shoulders. Mattress as used herein may include various types of reclining or sitting support surfaces, including sofas, chaises, couches, reclining chairs, beach chairs, chairs, comfort and support pads and add-ons to the foregoing and combinations of the foregoing.

Wooden compression spring coils and their shapes, relative proportions and dimensions, a method of producing such wooden springs, and mattresses incorporating such wooden springs, will now be described.

Wood, generally hard wood raw material, is selected that is, ideally, not pre-dried and is relatively knot-free. Also, the wood, ideally, should be free of cracks and breakage, and should have a moisture content between 15-25%. The wood, ideally, should have appropriate fiber content. Beech, oak, cherry, walnut or other nut tree wood can be used.

To test the bendability of the wood, a plank of 1600 mm×14 mm×13 mm may be cut, and may be planed, for example using an electric or other planar machine or a handheld planar or other such device. The plank may then be steamed at between 80° C.-100° C. and at a pressure of 0.6 ATM-1 ATM for ten minutes. Then the moisture content of the plank may be checked, and steaming can continue until the moisture content is between 40 and 80%. At this stage, the plank should undulate when shaken. The wood can then be wrapped on a reel, for example, on a cylindrical reel 8 cm in diameter, and if the plank can be wound around the reel twice without breaking, then the wood is probably suitable for the manufacture of the wood springs.

After the wood selection, the wood is cut into planks. Each plank may be 1600 mm-2000 mm in length, which may yield a coil spring that is 1,230 mm in height. The plank is sawed, milled, or otherwise cut into slats of suitable length to produce each coil. The wood may be planed, using an electric wood planar machine, handheld planar or other device.

The slat length will vary depending on the desired target height of the coil spring, for example, the slat raw, pre-processed length may be 2,000 mm-2,200 mm to produce a slat that is 2,000 mm or shorter in height after steaming and drying. To produce a coil spring that is 1,230 mm (48.425 inch)×13 mm×6 mm, planks could be cut to 1620 mm×80 mm×26 mm size. Slat length can vary between 80 cm and 300 cm, depending on target length of the coils.

Each such plank could be further cut to slats of size 1600 mm×14 mm×13 mm.

The length of the starting material for the coil can vary between 470 mm and 3,000 mm or longer. For example, the thickness of the slat may be 5-11 mm, which typically could yield a finished product, after drying, cutting and sanding of 4-10 mm. The width of the slat may be 5-21 mm, which can yield a finished product 4-20 mm in width.

Thickness as used herein may mean the shortest dimension of the slat, or the distance measured in a radial direction of the coil from the outer circumference of the coil to the inner circumference of the coil.

Width as used herein may mean the dimension of the slat greater than thickness but shorter than length, or the distance in an axial or longitudinal direction of the coil that measures the height of the wooden material that forms the coil at one turn.

The outer diameter of the coil may be 28 mm-110 mm, but after drying and processing this may change to 26 mm-108 mm. Sizes may change with steaming and drying. The following table provides examples:

| Section size (mm) | Diameter (mm) | Free Height (mm) | Solid Height (mm) | Force (N) | Spring Constant (N/m) | (kg/m) |
|---|---|---|---|---|---|---|
| 123 × 13 × 6 | 80 | 120 | 60 | 50 | 833 | 83 |
| 160 × 13 × 6 | 80 | 160 | 72 | 40 | 455 | 45 |
| 190 × 13 × 6 | 80 | 190 | 90 | 65 | 650 | 65 |
| 110 ×13 × 6 | 40 | 110 | 65 | 100 | 2200 | 220 |
| 115 ×12 × 4 | 40 | 115 | 65 | 50 | 1000 | 100 |

Free height is the height of the spring without any compression

Solid height: Height of the spring when it is fully compressed

Force: The needed force to fully compress a spring

Spring constant: How much force (N) is needed to compress a spring 1 meter long ((Higher spring constant means higher spring resistance) Spring constant=Force/(Free height−Solid height))

To achieve the 2,000 mm target length of material, the starting length of the slats may be 2,000-2,200 mm before the steaming and drying steps. The maximum length of the slat used to produce coil may be around 300 cm but, in theory, if longer slats can be obtained that are knot-free, then taller coil springs can be produced. The helical rise may be between 3° and 45°. The inner diameter of the helical coil may be 20 mm-100 mm. The spring force of the coil is inversely proportional to helical rise. The greater then helical rise, the weaker the spring force, all other features being equal.

A general rule is that the height of each turn of the coil should be greater than the thickness of the wood material of the coil. For example, the diameter of the coil may be between 2 cm and 11 cm. The thickness of the material of the coil may be between 4 mm and 10 mm. The outer diameter of a coil made of wood of such dimensions may be, for example, between 26 mm and 110 mm. Below a thickness of 4 mm, the material of the coil may become unstable and bend, whereas above 10 mm, the coil can become very stiff.

In general, a slat that is bent could have a length between 60 cm and 220 cm. But the necessary length of the slat before the bending depends on several factors, including the final length of the coil and the helical rise of the turns. For example, producing a soft 120 mm height coil, a 500 mm long slat (before bending) may be sufficient of if the helical rise is around 45°. Typically, the slat would be between 6 mm and 13 mm wide and between 5 mm and 9 mm thick.

Figure 15:
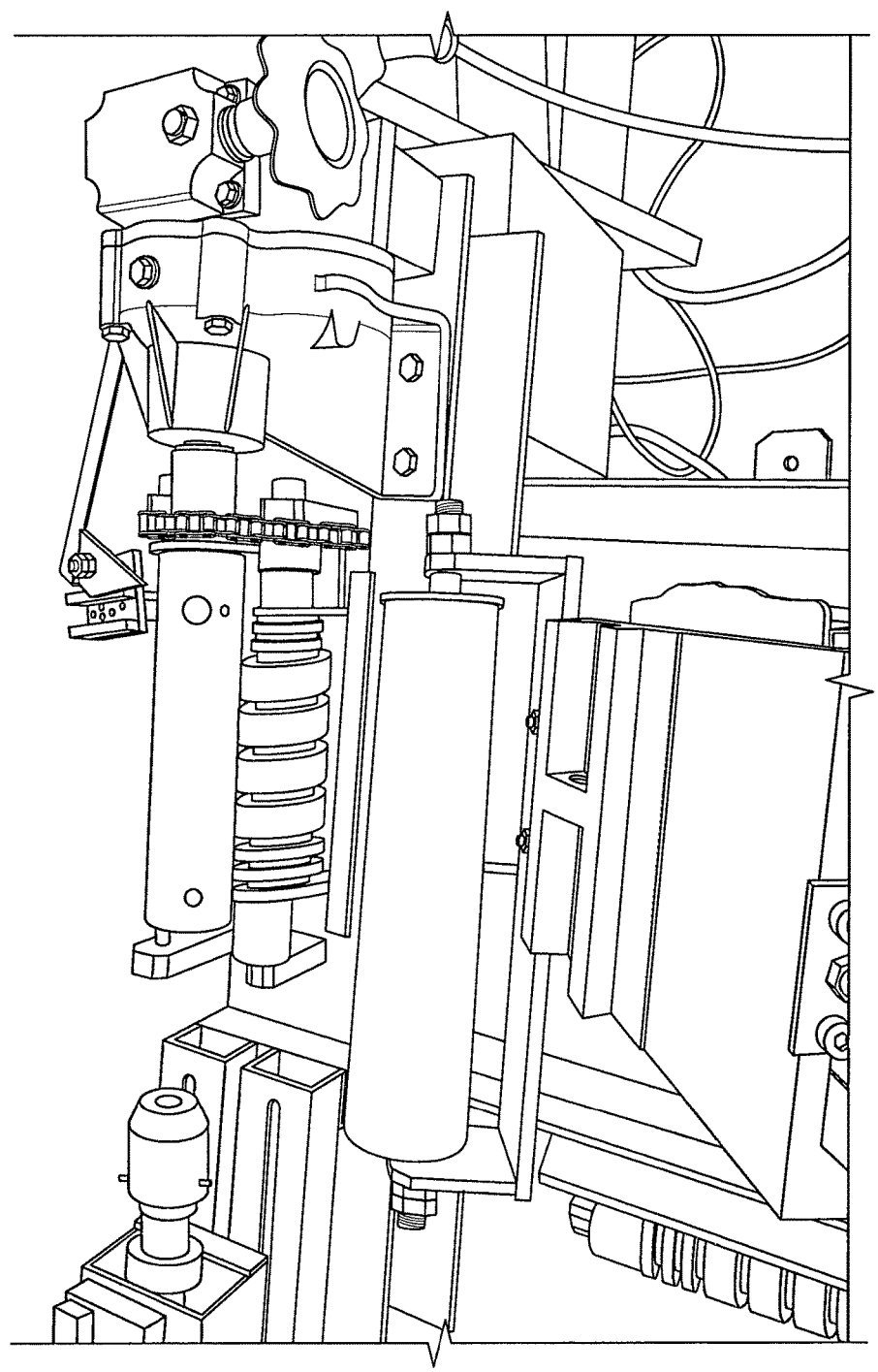
FIG. 15 illustrates an example of a reel and a guide reel for winding the slat to form a wooden coil, according to an aspect of the present disclosure.

The slats thus cut may then be wound on a reel, as illustrated in FIG. 15. For example, a cylindrical reel template made of metal may be used. Each slat that can be wound around the cylindrical wheel using a second cylindrical guide reel to wrap the slat to produce the coil. The end of the slat can be fixed to a portion of the winding reel, and the second end of the slat can be clinched or otherwise attached to the winding reel. The size of the guide reel can vary with the dimensions of the desired target wooden coil, for example, its length, width and thickness. It will be understood that other ways of creating a coil out of a wooden slat are also possible. The slats can then be steamed as described above for 10-90 minutes but often for 30 minutes or less.

The precise steaming time for the wood depends on the species of tree used, and within each species, the steaming period for any given lot of wood will vary depending on the grain, the season, how long ago the wood was cut, the moisture content, the ambient humidity during storage and other factors. Typical steaming time is between 10 and 30 minutes but may take 10-90 minutes. After 90 minutes of steaming, if the wood still has not reached the proper moisture content of between 40 and 80%, then the wood can be soaked in water for 24 hours and then steaming can be tried again. Such soaking opens the grains of the wood for the subsequent steaming step.

Following the winding step, the coils are dried. For example, each coil may be separately clinched on a cylindrical reel and may be covered and held tightly. The outer diameter of the cylindrical reels may correspond to the inner diameter of the coil. Each coil may be dried individually in its own drying chamber. Also, the coil may be dried in a convection or other type of oven, or may be irradiated, for example, using high frequency radiation, microwaves and/or infrared, which could substantially shorten the processing time required for the drying step. During the drying, the coils can remain secured to the same reels to which they are attached in the winding step.

In a traditional drying process, drying time may be 20-40 minutes. The coils can be considered dry when their moisture content is between 6 and 12%. For many types of wood, the moisture level must be less than 10% after the drying. Typically, when drying a new lot of wood, an initial drying period can be tried, the moisture content can be measured and additional drying can be applied. Also, the moisture content can be continuously monitored during the drying process, or it may be periodically monitored throughout the drying process. It will be understood however that drying time is dictated by the wood's unique properties, the species of wood, the season of the year and other such factors.

Next, the dried coils are removed from the reels and are cut to their final coil dimensions, for example, using a CNC machine. In this way, the coils are cut to size. Further, they can be sanded or scraped or otherwise finished. For example, the outside of each coil can be sanded or scraped, using a sanding or scraping machine head, while the inside of each coil can be similarly sanded or scraped or may be sanded or scraped using a hand held device. For example, if the same head is used to sand or scrape both the inside and outside of the coil, then the coil may be secured or affixed or held when the sanding or grinding or scraping head is applied to the outside of the coil. If the thickness of the material before sanding ranges from 5-11 mm, then after sanding or shaping thickness may be 4-9 mm.

The dry coils are removed from the reels and their ends may be glued. The coils are then cut to size, for example using a CNC machine, while the coils are in a non-compressed state.

Figure 16:
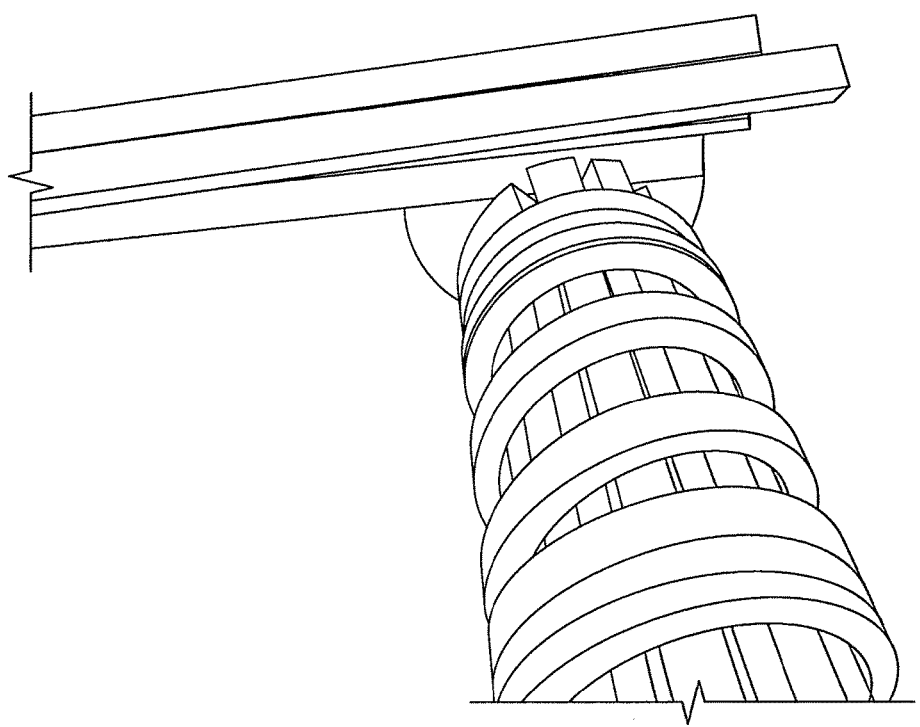
FIG. 16 illustrates an example of a template on which a wooden coil spring is wound for shaping the end turn after drying, according to an aspect of the present disclosure.

FIG. 16 illustrates the coil in production on a measuring template or reel. FIG. 16 illustrates the end of each coil before it is cut to length. Positioning box, which is illustrated as a white plastic box in FIG. 16, facilitates controlling where the end of the coil should be and where it is to be cut. The spacer, illustrated in FIG. 16 is a piece of wood, but it will be understood that other kinds of spacers, and spacers made of other materials, may also be used. The spacer indicates where the coil is to be cut along its axial length. Then the coil may be turned so its other end can be cut to length as well. Or, two saws, such as a double-headed circular saw with the heads set to a desired size, may be used to cut simultaneously both ends of the coil. For example, a cutting template may be set at 130 mm so that both ends of the coil are cut simultaneously for a 130 mm length coil. It will be understood, however, that the coil may reach it final length after it is sanded/scraped/chiseled or the like.

Figure 17:
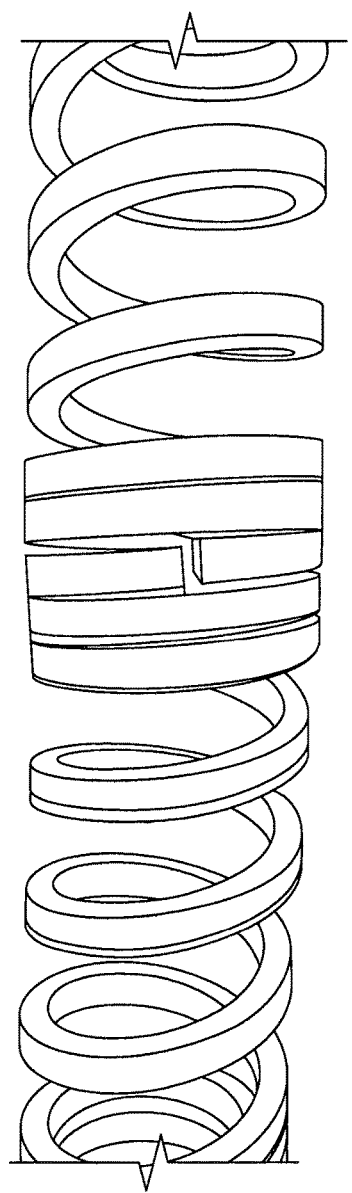
FIG. 17 illustrates an example of two wooden coil springs held end to end as part of the drying step, according to an aspect of the present disclosure.
Figure 18:
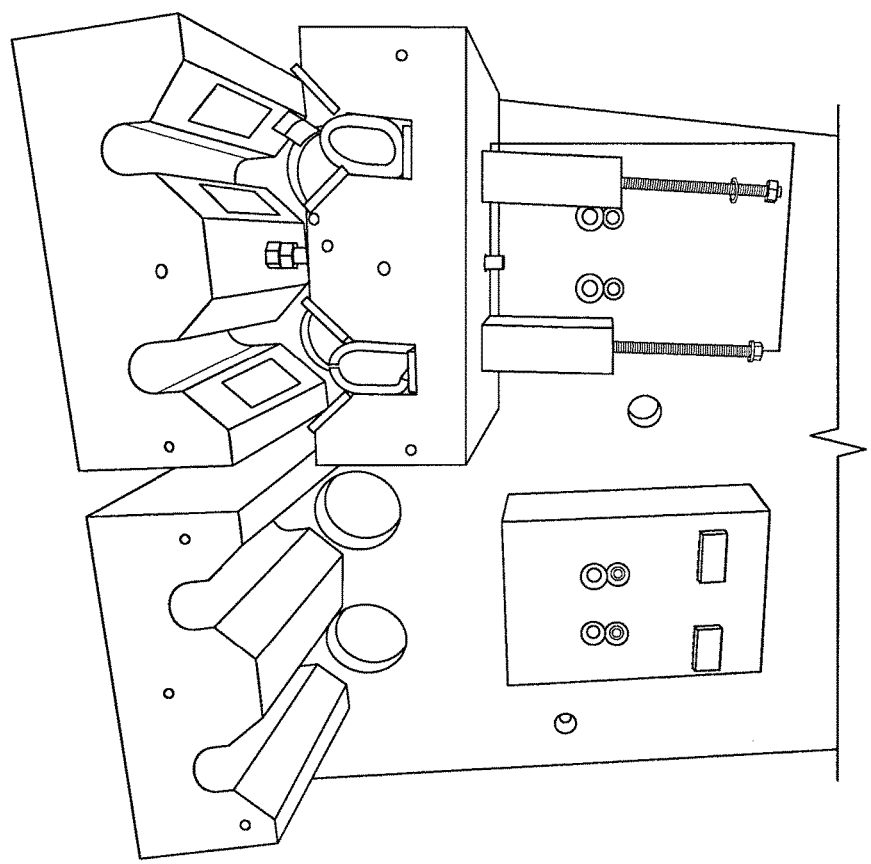
FIG. 18 illustrates an example of a wooden coil spring held in a device where it is sanded or otherwise finished, according to an aspect of the present disclosure.

As illustrated in FIG. 17, two different coils may be processed next to each other, such that the end turns of each coil are held in the same drying template or device. This facilitates the gluing process, since two coils are processed in the same gluing step in the same device.

According to the requirements of the mattress, during this final cutting step, the last turns of the coils are formed. The final turn of each coil is between 5 and 300% of the height of the other "intermediate" turns of the coil. For example, if each intermediate or standard turn of the coil is 13 mm in height, then the height of the final turn of the coil can be between 0.65 mm and 39 mm. The shape and dimensions of the last turn of the coil has important consequences for the course of compression of the coil. The course of compression, or the spring stroke length, equals the height at its "free height" or relaxed non-compressed state, minus its "solid height." The solid height is the position at which the coil has been loaded and has reached its most compressed state. At the solid height, each turn of the coil may be touching its adjacent turns.

In general, the thicker the end turn, or both end turns of the coil, the shorter the course of compression. Thus, thicker end turns mean that the coil reaches its state of total compression faster and becomes harder faster, and a mattress (or a portion of a mattress) using such coils may feel firmer.

If the material of the end turn of the coil is wider, for example, three times wider than the width of the material of the remaining turns, then the coil has less springing force, that is, the coil soon reaches its hard supportive position as a supporting element of the mattress. The height of the coil, and the size and relative proportions of the end coil, allow for great variation of the overall support and feel provided by the mattress. For example, at the portion(s) of the mattress corresponding to the shoulders of the person lying upon it, the coil may be approximately 16 cm in height for a softer, cushier feel, or 12 cm in height for firmer support. For the thoracic spine, the coil springs of the mattress may be 12 cm in height because these springs support less weight, while at the hips, a 16 cm tall coil spring may be used in the mattress for a softer, cushier effect. In this way, the springier support allows for more "give" and thus the person lying on the mattress experiences more alignment of the shoulders, spine and hips, even when lying on his or her side. That is, a 16 cm coil spring could feel more springy or softer and could provide more "give" and thus, since the person's shoulder and hips are allowed by the coil springs to sink more into the mattress, the alignment of the head, neck, shoulders, spine and hips may be more natural and healthy.

Narrower end turns are thus often more desirable to achieve a more springy feel for the coil. There may be up to an 11 mm variation in the compression distance (course of compression distance between free height and solid height of the coil) between coils of identical length. This variation is determined by the width of the end turns.

Figure 9A:
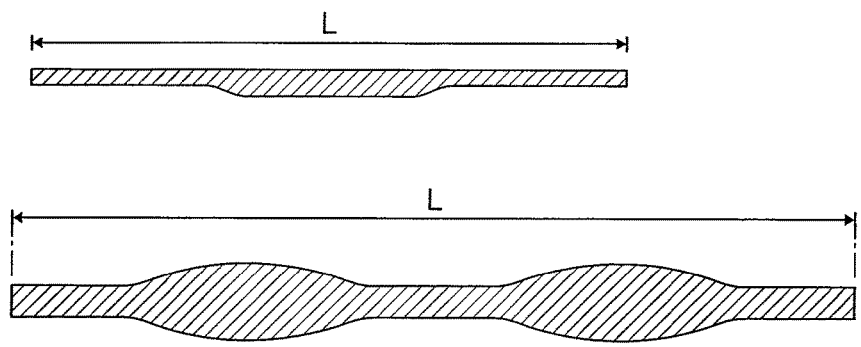
FIG. 9A illustrates an example of wooden slats with varying thickness and width to be made into coil springs, according to an aspect of the present disclosure.

The slat that will be bent into the coil can have a consistent thickness and width throughout its length. Alternatively, the thickness and/or width of the slat can be varied because different widths and thicknesses produce different properties for the final coil spring. In addition, since during the soaking or steaming steps of the wood, the outer shell of the wood can become cracked at several points, milling of the slat to remove such cracked portions allows such remaining portions of the slats, which would otherwise be wasted, to be used. One end turn of the coil may have a different thickness then the end turn at the other end of the coil spring. Thus, the coil spring may be asymmetric. FIG. 9A illustrates an example of a slat with varying thickness. In addition, the height of each turn of the coils can be decreased. Upon compression, each turn of the coil will not be completely flush with adjacent turns. Thus, there will be portions of the coil where at the point of total compression or "solid height" air will still be able to escape at the sides between turns from the spring. Thus, a more airy spring can be created. This may be important for marketing purposes because a more airy looking spring can be provided to the customer.

A coil can have several turns at one or both of its ends, for example, between 1 and 3 "end turns" joined together, for example, using glue, one or more screw, bolt, bracket, nail and/or rivet or other fastener, including ropes and bands, to produce thicker end turns. Each of the turns can be between 5 and 300% of the size of the "regular" remaining non-end turns of the coil. The ends can be shaped by wood file, sanding, scrapping, grinding or milling, for example, using emery.

In general, all other factors remaining unchanged, thicker end turns create a coil spring that requires more force to reach total compression, or its "solid height," the point at which no further compression is possible. At this point of total compression, each of the turns may be touching adjacent turns. Conversely, if the end turn, or, as discussed above, if both of the end turns of the coil spring, is made of thicker material, then a firmer feel is achieved for the sleeper on the mattress. Stated differently, with a different end turn, the spring stroke length, or course of distance compression, decreases. Thus, by varying the end turns of the coil spring, the designer can vary the support firmness provided by the mattress. A thicker end turn provides a firmer support, assuming other factors, such as helical rise and the like, are kept unchanged.

Figure 14A:
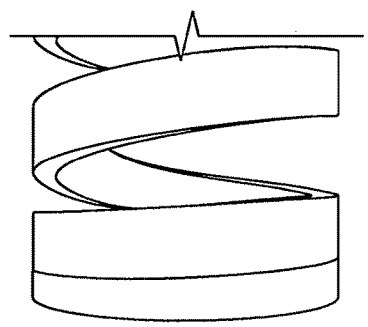
FIGS. 14A and 14C illustrate an example of a wooden coil spring with an end turn formed of several turns affixed or secured together, according to an aspect of the present disclosure.
Figure 14B:
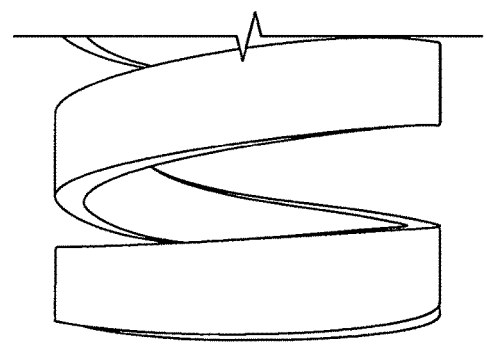
FIG. 14B illustrates an example of a wooden coil spring with an several turns that are shown as affixed or secured together in FIGS. 14A and 14C, according to an aspect of the present disclosure.
Figure 14C:
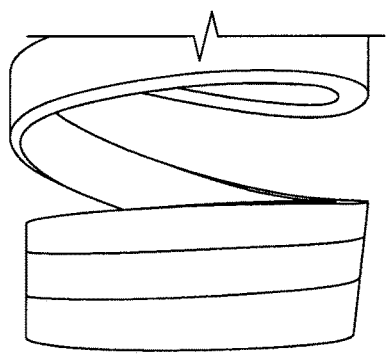

Accordingly, after the formation of the coil, several turns at the end may be glued or otherwise secured together, as illustrated in line 30, FIGS. 14A-14C. In this way, a wider final end turn may be produced, thus creating a coil spring that provides support of greater firmness. In addition, the end turn on each of the ends of the coil spring may thus be varied, for example, may be made more wide by gluing, screwing, bolting, nailing, bracketing or attaching or otherwise securing together the final turns on both ends of the coil, to produce a coil spring with more firmness. The thickness of an end turn or of both end turns may also be modified after processing to change the spring characteristics and comfort provided by the coil. Also, an end portion, or both end portions, of a slat may be modified before or during processing so that the resulting coil has an end turn, or both end turns, with a target width and/or thickness, or so that the resulting coil has an end turn, or both end turns, with a width and/or thickness of a target relation or ratio or proportion to the widths and/or thicknesses of intermediate or remaining turns of the coil.

Figure 9B:
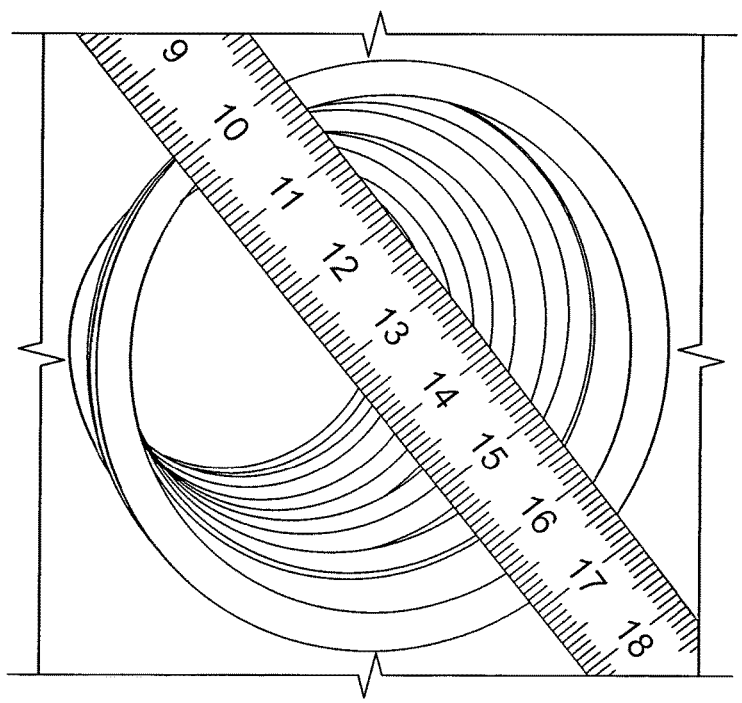
FIG. 9B illustrates an example of wooden coil spring having turns of increasing diameter, according to an aspect of the present disclosure.

FIG. 9A illustrates that the slat used for making the coil is thinner at the beginning and end. For example, the first and last third of the slat may be thus thinner. FIG. 9B illustrates a coil with a thinner top portion. Coil A with thicker end turns compared with Coil B has an increased solid height and thus a decreased stroke length compared with Coil B. Coil A thus gives less total resistance before reaching its solid height. In this way, identical length coils may be made more or less springy by making the material thinner or narrower at one or more parts thereof. Thus, by sanding, scraping, chiseling or otherwise making thinner or narrower the material of the spring, even after it is near completion, a different feel for the spring can be achieved.

FIG. 9A also illustrates a coil made from a slat with varying width. By producing such a coil, an "airier" looking coil can be produced. This gives the aesthetic impression of a "lighter" and more breathable coil and mattress.

With compressed wood that is bent into coils or helices to produce the coil springs, it is difficult or impossible to control the end turns or the number of end turns or their thickness. Typically, there will be great variation also between springs in terms of orientation or position of the portions that correspond to the last turns. After gluing or otherwise fixing the end turns of coil, the outer lateral surface of the end turn is cut and sanded to achieve a right angle or near right angle with respect to the longitudinal axis of the coil. When using compressed wood for producing the coils, stresses are built up in the grains of the coil, which produces internal pressures in the coil that can distort the shape of the wood and cause deviation from the end turn being perpendicular to the longitudinal axis of the coil. Such perpendicular or near perpendicular positions, are illustrated in FIG. 16, where the drying coils have lateral outer end turns that are nearly at right angles with respect to the longitudinal axis of the coil. Perpendicular as used herein may mean within manufacturing tolerances of 90 degrees. Substantially perpendicular may mean within 15 degrees of perpendicular. Substantially equal may mean not varying at greater than by an acceptable tolerance range for the industry. Typically, at least a 180° portion (a near semi-circle) of the end turn needs to be at right angle or near right angle to achieve good gluing of the end turns. Thus, sanding and cutting such ends to try to produce an end that is perpendicular to the longitudinal axis of the coil can cause loss of significant material. With compressed wood, as discussed, the distortion caused by the internal stresses of the wood, cause distortion that is difficult and impossible to reverse. Therefore, to ensure such a perpendicular end turn, the coil needs to be produced from a slat of additional length so that the end turns can be cut as needed to yield the perpendicular end turns.

Accordingly, an advantage of using non-compressed wood is that since there is likely to be less distortion, or at least distortion that cannot be corrected, producing an end turn that has a lateral outer side that is perpendicular to the longitudinal axis of the coil is more predictable. This in turn, as discussed, can result in less waste, since most of the time the slat need not be substantially longer than necessary to yield a working margin after it is dry. On the other hand, with non-compressed wood, it is easier to control the thickness of the last turns of the coil spring and to control their uniformity. Thus by controlling the last turn, or the end turns at both of the ends of the coil spring so that the last turn is thinner or thicker than the material of the remaining turns of the coil spring, the firmness of the spring can be controlled. For example, if the average turn has a height of 13 mm, then the last turn can have a height between 0.65 mm and 39 mm, that is the last turn can be between 5% and 300% of the remaining turns or intermediate turns or non-end turns of the coil spring. In this way, production of spring coils with advantageous torque strength for average weight shapes of approximately between 50 Nm and 70 Nm may be possible.

Figure 19:
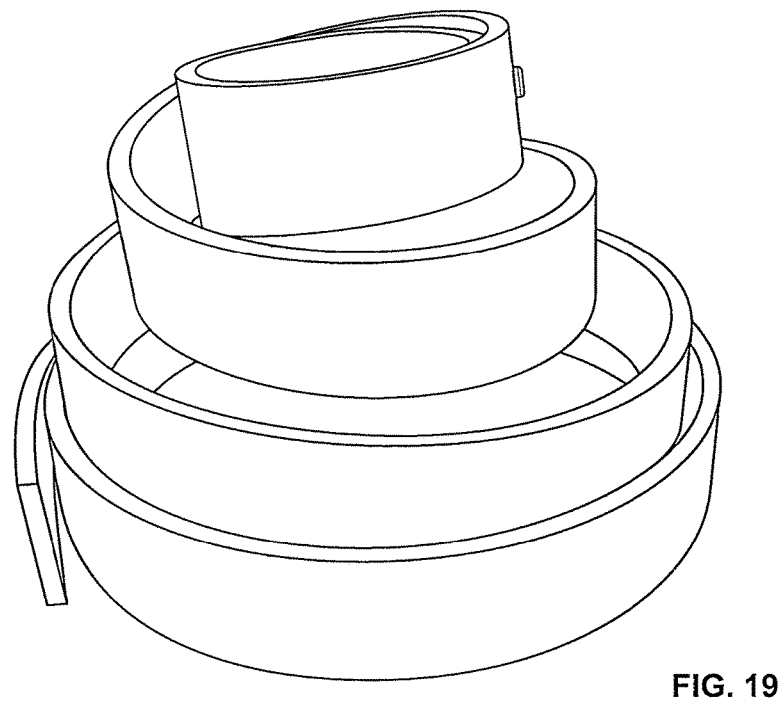
FIG. 19 illustrates an example of a wooden coil spring with a cone or truncated cone shape, according to an aspect of the present disclosure.
Figure 20:
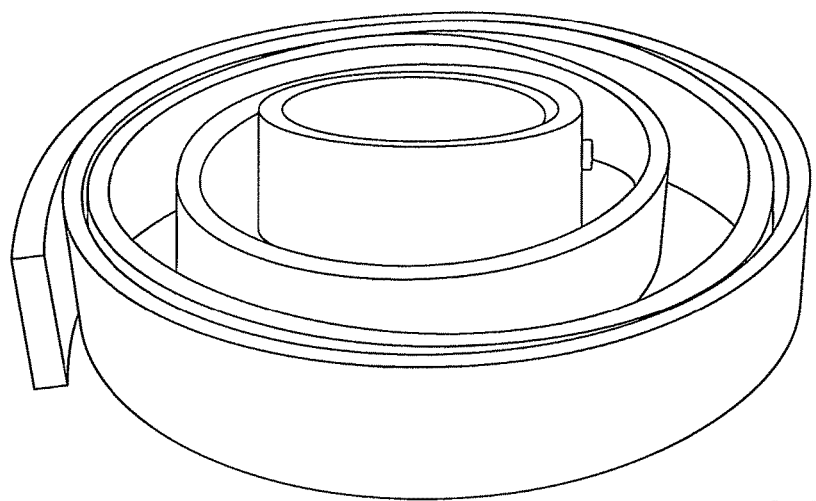
Figure 21:
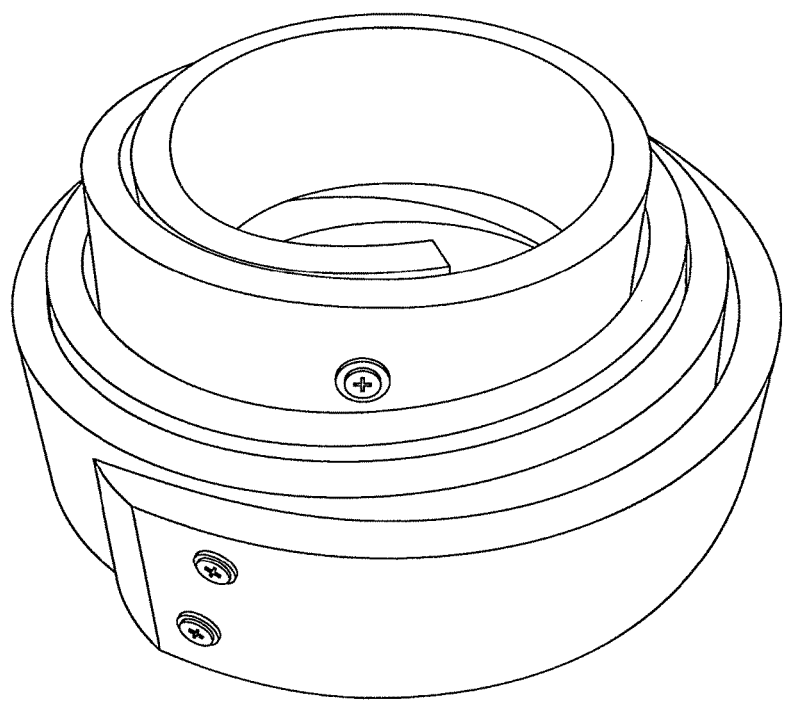
FIG. 21 illustrates an example of a wooden coil spring with a cone or truncated cone shape in a compressed state, according to an aspect of the present disclosure.

FIG. 19 illustrates a wooden coil with a cone-shaped or truncated cone-shaped profile. With such a cone or truncated cone profile, each turn of the coil has a diameter slightly smaller than the previous adjacent turn. In this way, one end of the coil is at or near a center of a spiral, while the second end of the coil is at an outer portion of the spiral. FIG. 20 illustrates the cone or truncated cone wooden coil in the compressed state. Such a coil can have a longer stroke or course of compression than a helical cone that has a cylindrical outline with a longer stroke or course of compression, the feel of the coil is more springy. This is a result of the fact that the end turn of the coil with a shorter diameter is received inside concentrically with the remaining turns. Stated differently, the coil continues to provide its spring function along a greater distance before reaching its totally compressed state at which it becomes a harder support structure.

Such a cone or truncated cone coil may be made from a slat with a thickness of 5-11 mm before processing, which after processing when finished may have a thickness of 4-11 mm. Similarly, raw width may be 16-36 mm, which after processing may be 15-35 mm. The outer diameter of the coil before it is dried, cut, sanded and glued may be 100 mm-135 mm, while the outer diameter of the finished coil may be 96 mm-131 mm. Helical rise may be between 3 and 30°

The end turns of the wooden coil with an outline in the shape of a cone or truncated cone may be glued, riveted, screwed or otherwise secured, fixed or attached together. Similarly, the end turns may be tied, or otherwise banded together. Such a cone may be made on a similar type of drying reel but such a reel could have a cone or truncated cone shape so that the coil achieves the cone or truncated cone shape. The ends may be cut and sanded/chiseled in the same way as the cylindrical coil described herein. For example, one end may be affixed to be held in place, for example, on the drying reel, while the free end of the cone is cut to size. The ends turns of the coil at one or both ends of the coil may be secured together, for example, by screwing, but other means, such as gluing, taping, riveting, nailing, or tying, may be used instead of or in addition to screwing. Such a coil may be hand sanded/scraped/chiseled using a hand tool or a power tool, or a using a suitable table tool.

Figure 12:
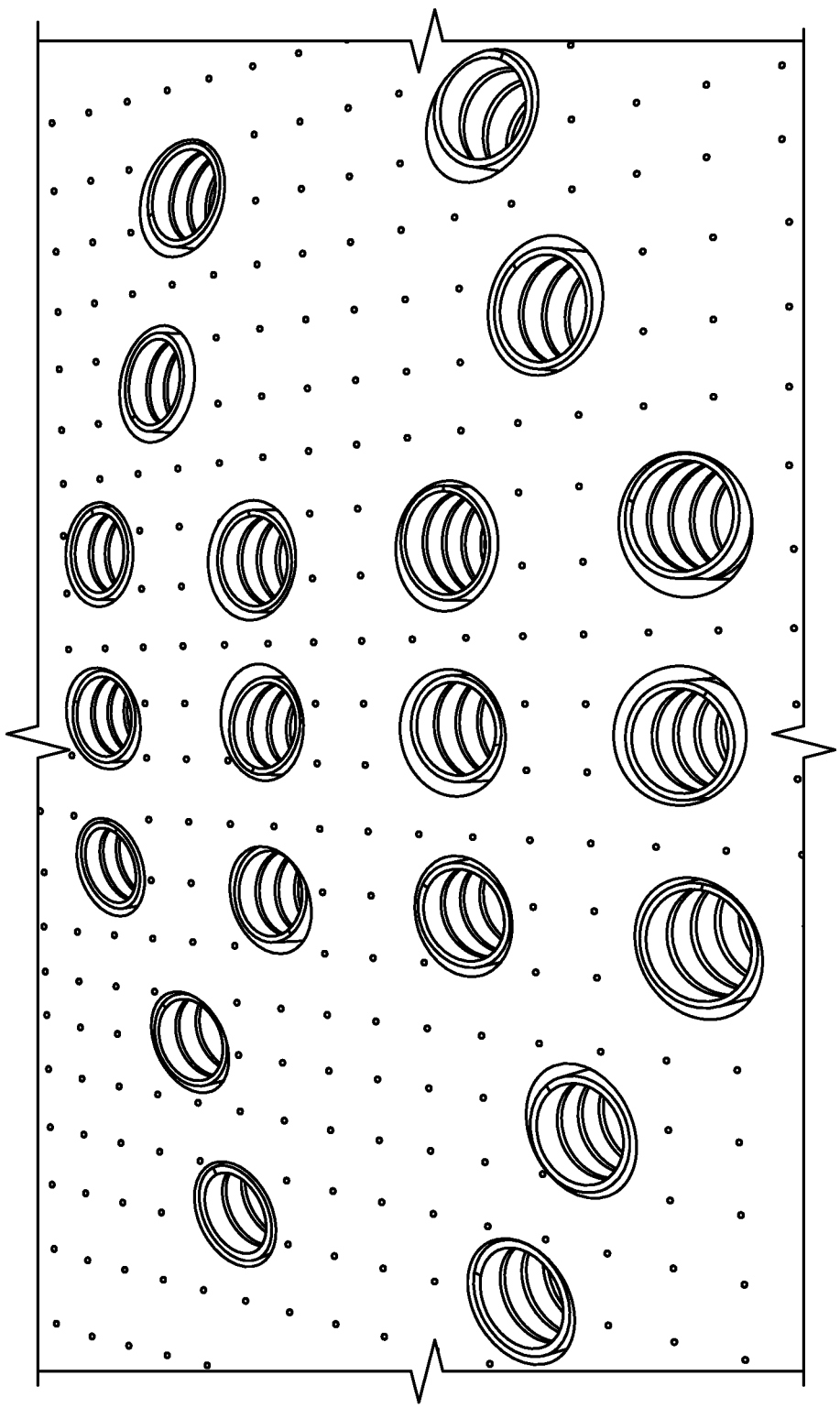
FIG. 12 illustrates an example of a mattress with wooden coil springs inside a core layer, according to an aspect of the present disclosure.
Figure 13:
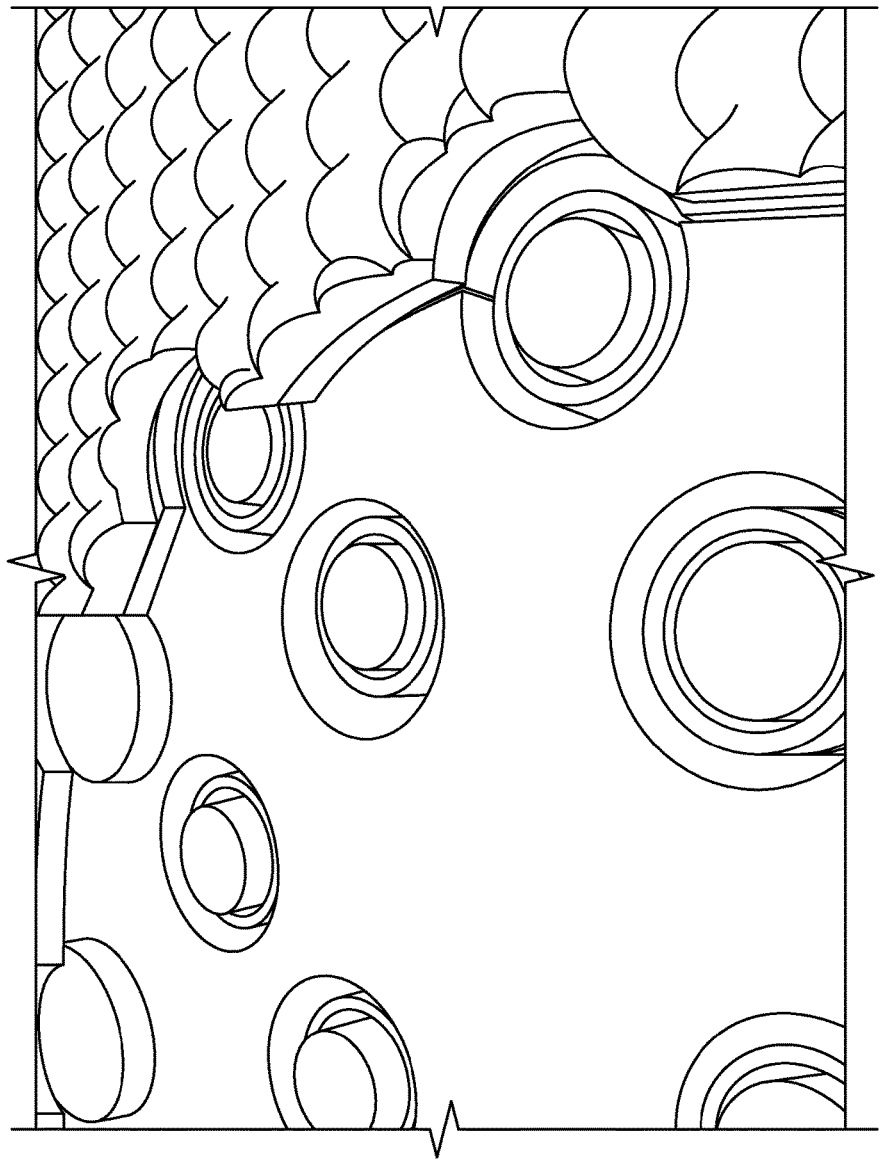
FIG. 13 illustrates an example of a mattress with wooden coil springs inside a core layer and cushioning inserts inside the coil springs, according to an aspect of the present disclosure.

The springs are then placed in a core layer of the mattress body, as illustrated in FIGS. 12 and 13. For example, a natural latex core layer, or other type of core layer, such as foam, including memory foam or rubber may be used. Typically, springs may be placed such that a distance between the springs is at least 1 cm and at most 30 cm. Cone or truncated cone-shape coils may be placed into the mattress in the same manner as other coils described herein, that is, for example, holes may be drilled into the core layer or the core layer may be formed with the holes, and the coils may be then placed inside. One or both ends of the coil may then be secured to neighboring layers, such as to a stabilizing layer.

The coils may be positioned in the mattress as pocket springs, each spring individually wrapped and separated from other springs or from other separated pocket springs.

As discussed, the mattress can be a bespoke mattress, designed according to the personalized needs of the customer, in terms of firmness and support of the zone of the mattress, based on expressed customer preference and/or customer size and weight, or the like.

Further, the springs may be tied together using a stiff or springy material. For example, the pocket in which the coil springs are positioned may be tied together.

In addition, portions of the mattress may have no springs but may contain other types of supportive materials, such as other types of coils, latex, memory foam, webbing or the like.

In addition, the diameter of the spring as well as the layers of the mattress above and below the core layer in which the wooden springs are located, may also be varied and designed to create a personalized mattress.

Figure 10A:
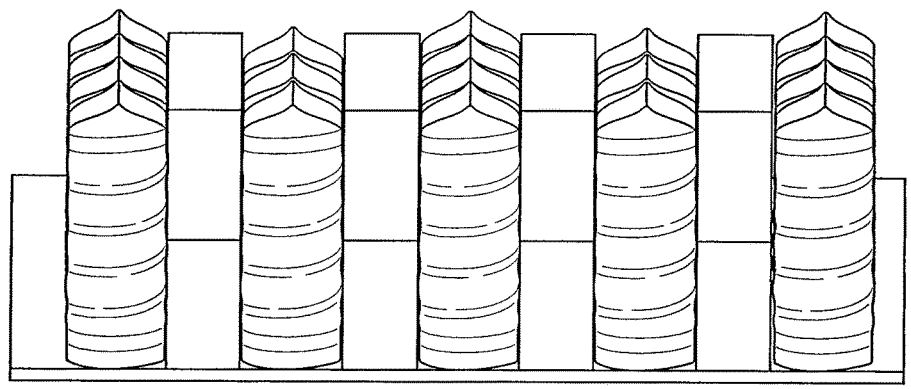
FIGS. 10A-C illustrate examples of connected pockets containing wooden coil springs, according to an aspect of the present disclosure.
Figure 10B:
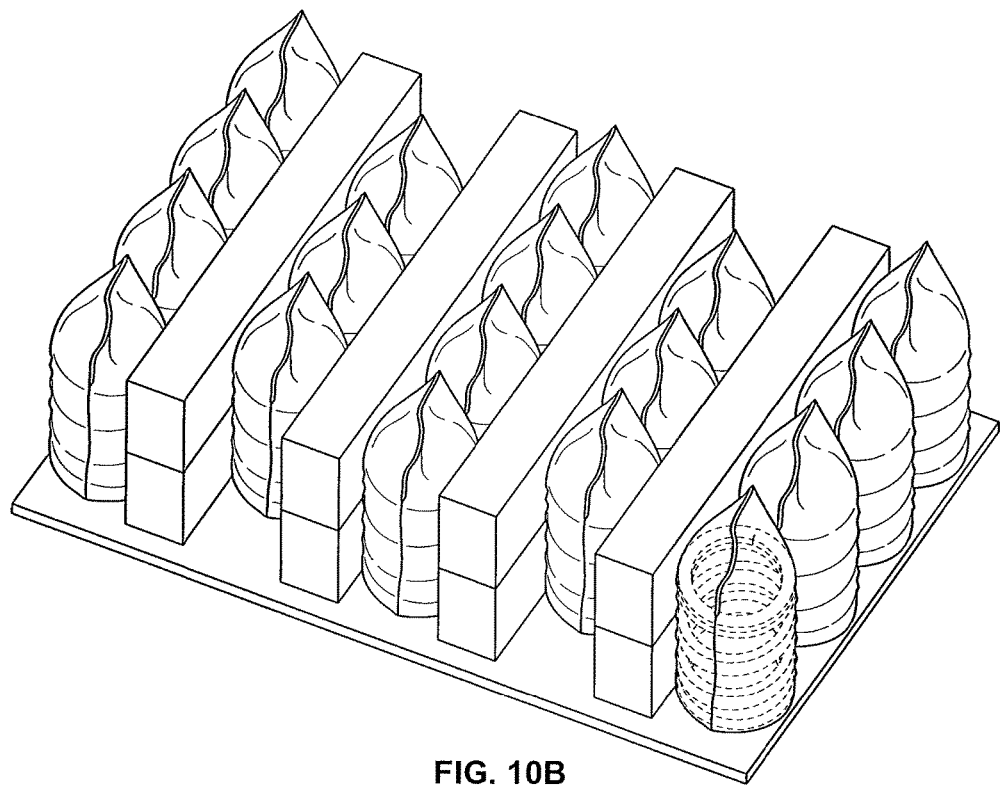
Figure 10C:
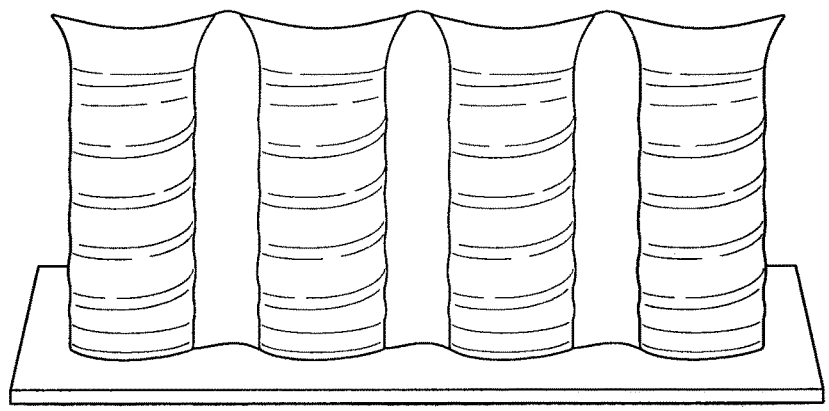
Figure 11:
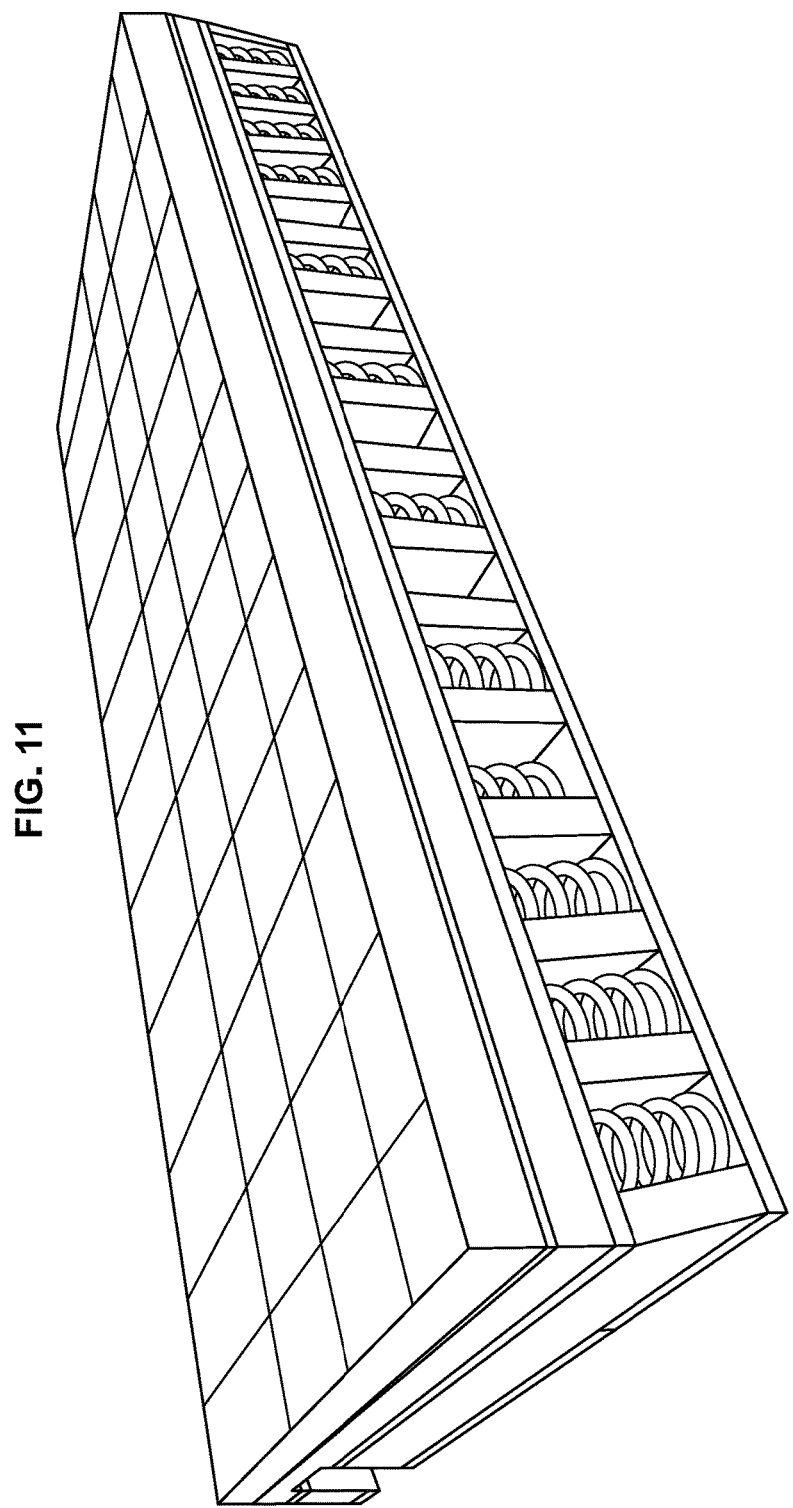
FIG. 11 illustrates an example of a mattress with wooden coil springs separated by dividing elements, according to an aspect of the present disclosure.

Since the wooden springs are individually manufactured, the springs that are positioned at each portion of the mattress can be more readily controlled so that the target firmness is customized. By way of contrast, metal springs tend to be more uniform because they are manufactured to be identical with each other. Thus, neighboring wooden springs, for example, neighboring pocket springs, may be varied as needed for the customization using the wooden springs of the present disclosure. Thus, theoretically, each mattress can be made individually based on the demands, preferences and needs of the end customer. In addition, rows of pocket springs may be connected together, such that each pocket is connected to adjacent pockets of the row, but the rows may be separated from one another using foam, latex, synthetic latex, all-natural latex, organic or ergo-latex, foam, including cold foam or the like, wool, cotton, horse hair, camel hair, llama hair, coir natural fibers, or a combination of the foregoing used as a dividing layer, as illustrated in FIGS. 10A, 10B and 10C. Typically, the rows can be glued or tied or otherwise attached to the dividing or separating elements between the rows. Such dividing elements can be made of the same material or different materials may be used to divide the various rows. Latex or ergo-latex materials may be used as a dividing layer. Materials used for the dividing layers will also affect the stiffness or firmness of the mattress, and thus can be customized according to the target parameters of the mattress. Another approach is to put dividing elements between every single coil spring and thus dividing each spring of the mattress, as illustrated in FIG. 11, from each of its adjacent springs using such dividing elements. Later the mattress may be made of various known materials, including latex, foam, wool, cotton, coconut fiber, horse hair or a combination of the foregoing.

The glued and dried and sanded coil may then be waxed using one or more commercially available waxes. For example, Hartwachs produced by Remmers may be used. Such waxing may prolong the useful life of the coils. In certain regions such as tropics and other areas of high humidity, the wax will tend to protect the coils. For coils made of non-compressed wood, it may be desirable especially to use wax to prevent deformation of the shape of the coil. The coils are dipped into the hard wax. For example, the coils may be dipped for ten seconds or the like.

Also described is a mattress comprising such wooden springs, or a combination of wooden springs and other springs, such as springs made of steel or other metal and/or alloys. Wooden springs can regain their shape 100%, can have three times longer working lifespan, and, as discussed, are free of electrical and magnetic fields and electrostatic smog or noise.

Figure 2:
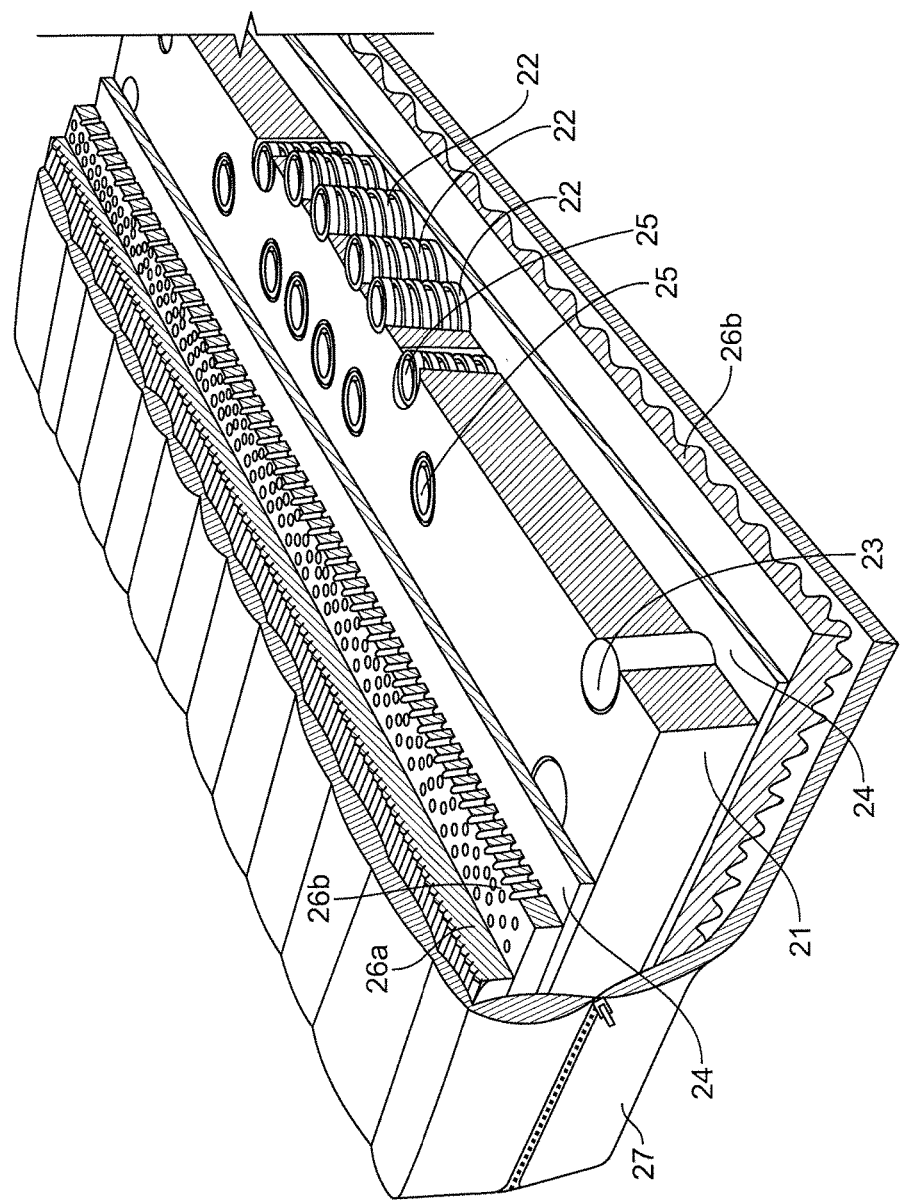
FIG. 2 is a perspective view illustrating an example of a mattress with a core layer including wooden springs and showing an embodiment of the comfort layer, according to an aspect of the present disclosure.
Figure 3:
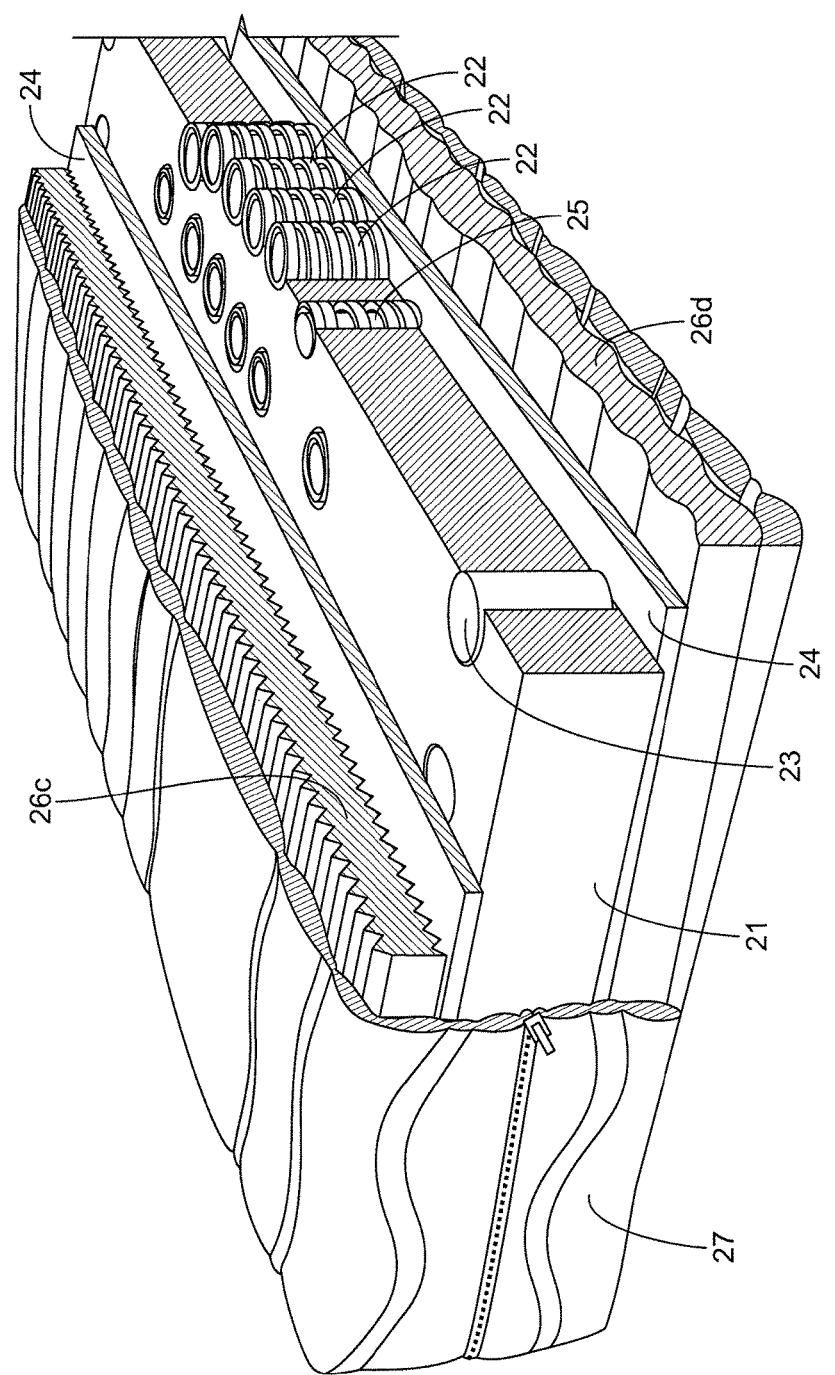
FIG. 3 is a perspective view illustrating an example of a mattress with a core layer including wooden springs with a ridged comfort layer, according to an aspect of the present disclosure.

FIGS. 1-3 illustrate a mattress that includes a mattress core 21 that includes the wooden coils 22. In addition, a stabilizing layer 24, and several comfort layers 26 and 27 may also be provided. A stabilizing layer is not always necessary for every mattress. For example, a spring coil that is 120 mm tall, with a diameter of 80 mm, which are inserted into 160 mm thick latex coil layer, then a stabilizing layer may not be needed, since the 160 mm thick coil layer will secure the spring.

The wooden springs may be positioned such that only the middle third of the mattress, in the longitudinal direction, receives the wooden springs. The wooden springs may be positioned inside inserts 25 or without such inserts. The first third and the last third of the coil layer in the longitudinal direction may receive inserts 23 instead of or in addition to the wooden coil springs. In FIG. 1, comfort layer 26 is shown as having perforations or scoring. Such perforations or scoring help adhere it to the core layer 21 or to stabilizing layer 24. The upper and or lower surfaces of comfort layer 26c and 26d may be wavy or comprise ridges. Thus, the core layer, and, if provided, the stabilizing layer 24, may be secured to comfort layers 26c and 26d using these ridges. In FIG. 2, comfort layer 26 is made of two parts, such that the bottom comfort layer 26b is scored or is perforated while the top comfort layer 26a has a smooth outer region.

Figure 4:
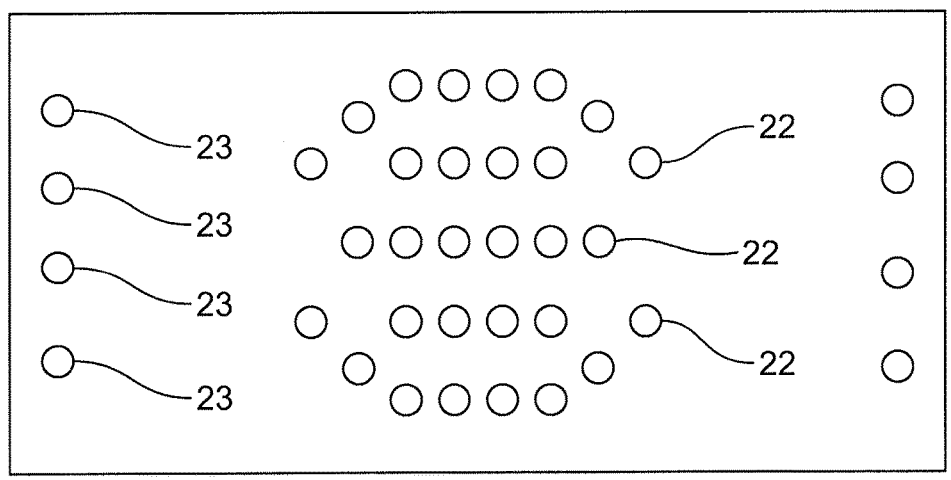
FIG. 4 illustrates an example of positions of wooden coil springs in the mattress, according to an aspect of the present disclosure.

FIG. 4 illustrates the positioning of wooden springs 22. FIG. 4 also illustrates the positioning of the support elements 23 that provide additional air circulation.

Figure 5:
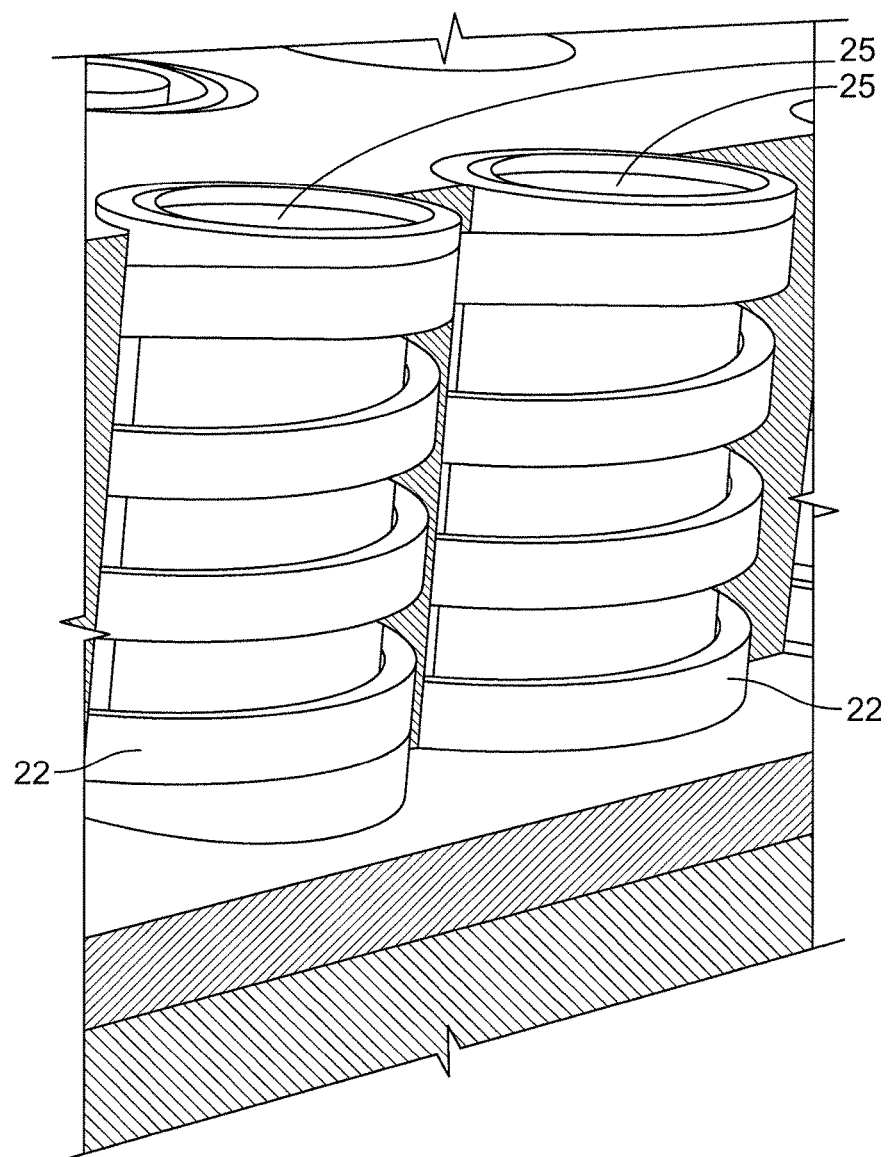
FIG. 5 illustrates an example of a mattress with wooden coil springs positioned at the comfort layer, according to an aspect of the present disclosure.

FIG. 5 illustrates how springs 22 are positioned directly on the smooth outer surfaces of stabilizing layer 24.

Figure 6:
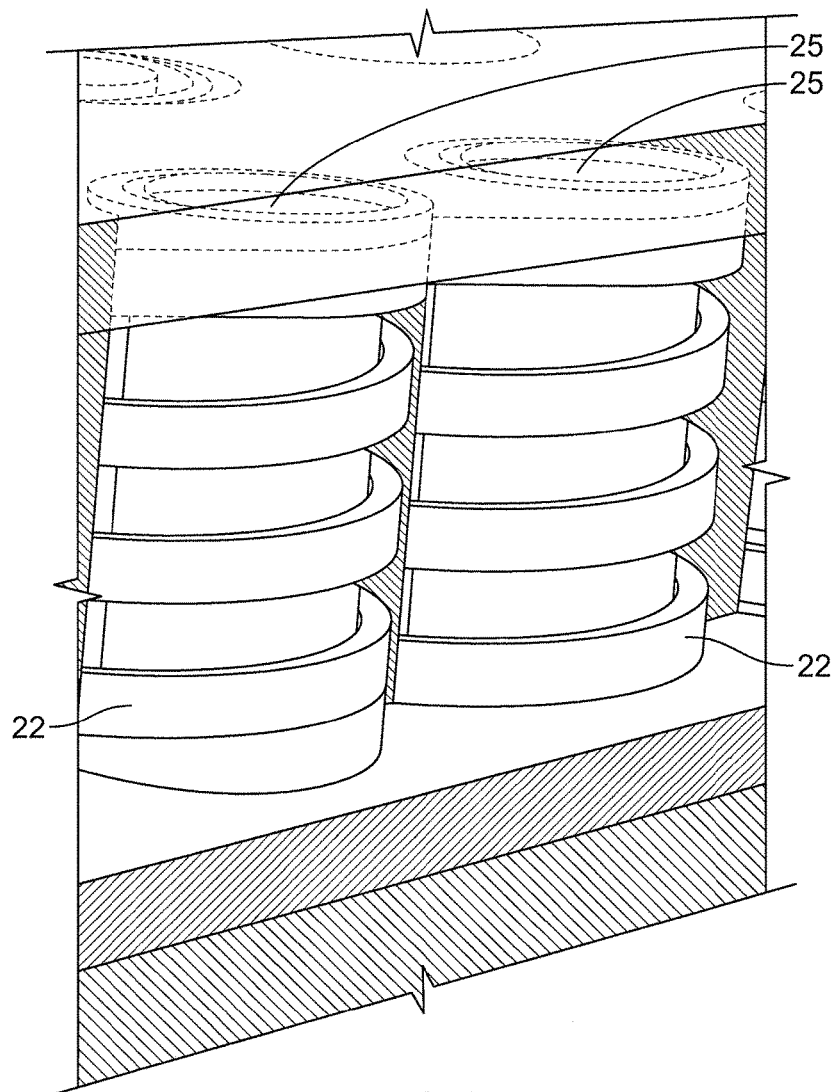
FIG. 6 illustrates an example of a mattress with wooden coil springs affixed to the comfort layer, according to an aspect of the present disclosure.

FIG. 6 illustrates the positioning of springs 22 into the upper stabilizing layer 24 and how springs 22 make therewith.

Figure 7:
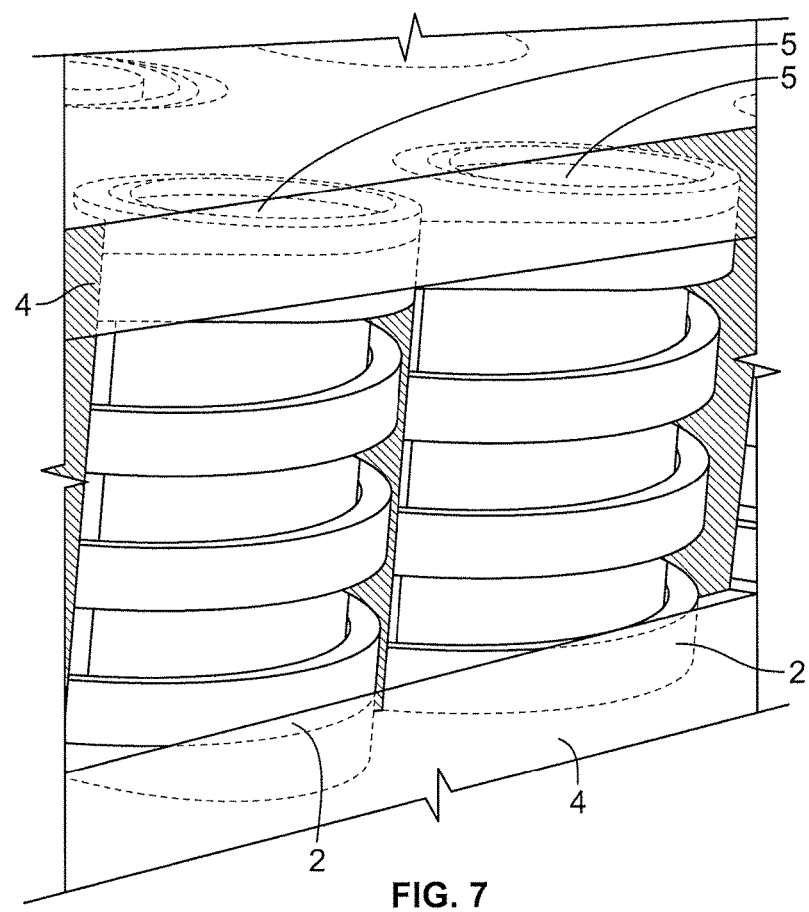
FIG. 7 illustrates an example of a mattress with wooden coil springs affixed to both upper and lower comfort layers, according to an aspect of the present disclosure.

FIG. 7 illustrates the coil is embedded in both the upper and lower stabilizing layer.

Core layer 21, stabilizing layer 24, and the comfort layers 26a and 26d may be made of the same material or they may be made of different materials from each other. These layers may be made of foam, latex, visco elastic foam, sponge, rubber, including synthetic rubber, polyurethane-based foam or coconut materials or fibers, wool, cotton, horse hair, or other animal hair or fur or plastic or other synthetic materials. In addition, stabilizing layer 24 may also be made of wood-based material. It will be understood that each of these layers may be made of a combination of the foregoing materials.

Wooden springs 22 may be attached to stabilizing layer 24 using a glue or other types of attaching means, such as they may be sewed or various needling means. The outside of the mattress 27 shown in FIGS. 1-3 is made of various materials, including natural materials, such as wool, cotton, or soy or bamboo-based materials.

Figure 8:
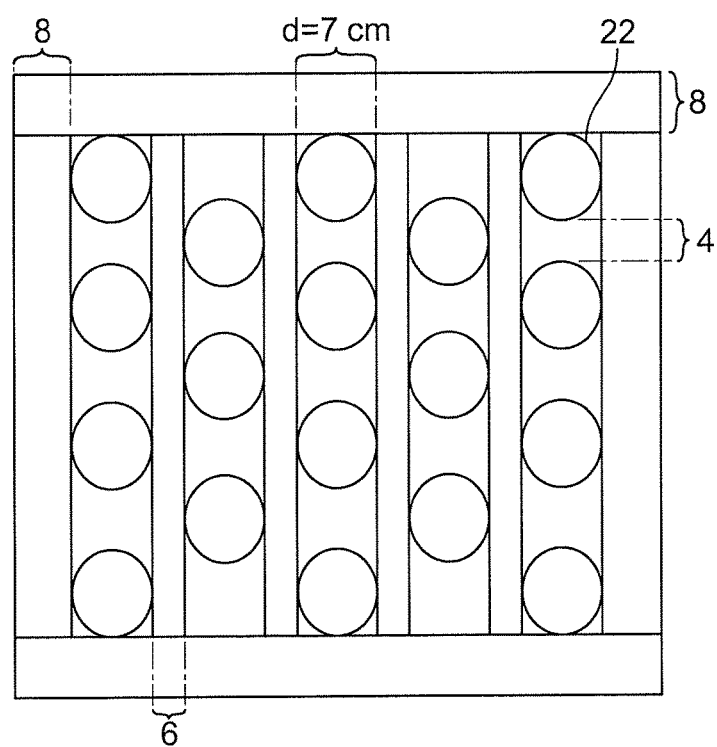
FIG. 8 illustrates an example of relative positioning in the mattress of the wooden coil springs with respect to each other, according to an aspect of the present disclosure.

FIG. 8 shows an example of the positioning of the wooden springs in the mattress relative to each other, showing the distance between various portions of the core layer of the mattress shown in centimeters. FIG. 8 illustrates, by way of example of one possible implementation, five separate inserts, each containing three or four spring coils, that are positioned in a mattress.

Figure 22A:
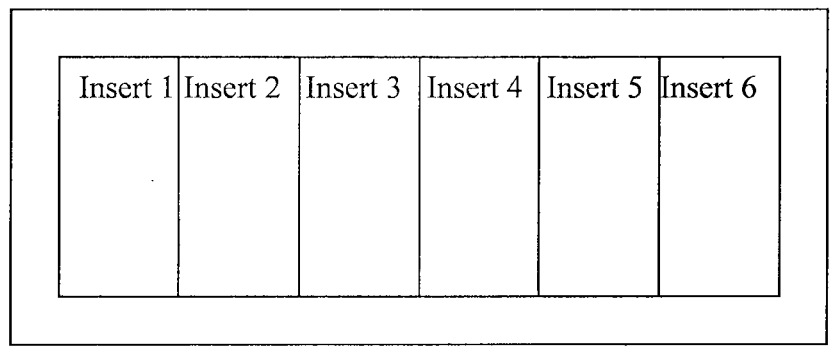
FIG. 22A illustrates an example of a mattress with inserts 1-6, the inserts including wooden coil springs, according to an aspect of the present disclosure.

An insert is an individual module or unit, which itself may contain one or more additional modules or units therein. FIG. 22A illustrates a mattress comprised entirely of inserts and a frame positioned around the inserts. The inserts may be identical to each other or a mattress may have inserts of varying dimensions. Similarly, the makeup or composition of each insert may be the same or may vary with respect to each other in the mattress. FIG. 22A illustrates a frame that may be 270 cm long and 90 cm wide, however it would be understood that other types and sizes of frames and inserts may also be used. While FIG. 22A illustrates six inserts, it would be understood that many more of fewer than five may also be used for a mattress or for a frame inside a mattress. The inserts may be directly attached to each other or may be divided using dividers. The dividers and the inserts may be made of any of the above-named materials or combinations thereof.

Figure 22B:
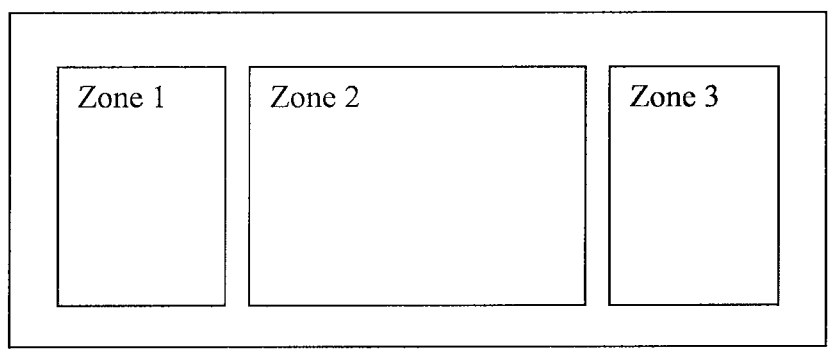
FIG. 22B illustrates an example of a mattress with different zones of firmness provided by wooden coil springs of varying firmnesses, according to an aspect of the present disclosure.

FIG. 22B illustrates inserts of different sizes and different firmnesses. For example, FIG. 22B illustrates zone one which may be used for the head or the foot, zone 2 which may be used for the waist area and zone 3 which again may be used for the head or the foot of the sleeper. Typically, the waist region of the mattress will provide more support, will be more difficult to compress, then other regions of the mattress, because of the greater weight of the average person in this zone. It will be understood that typically a heavier person will require or prefer springs that provide more resistance, that is, that are more difficult to compress or to reach the state of total compression, then a lighter person. However, different people have different comfort levels with firmer or softer support. The use of inserts of such different dimensions and different firmness, provides the ability to customize readily the mattress to the individual needs and preferences. Thus, the inserts can be pre-manufactured and the inserts can be placed into the mattress for the end user without needing to totally disassemble the mattress and the springs.

Figure 22C:
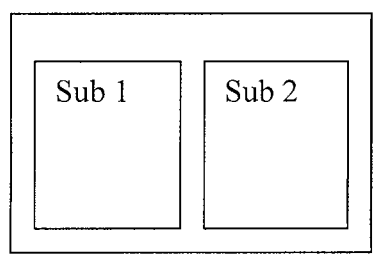
FIG. 22C illustrates an example of an insert with zones of different firmnesses positioned side by side, provided by wooden coil springs of varying firmnesses, according to an aspect of the present disclosure.

FIG. 22C illustrates sub-inserts 1 and 2 placed inside the larger insert. Thus, a customer can have softer and firmer feeling coils inside a single insert by the use of two sub-inserts. For example, a single insert for the head of a queen or king size mattress may have a Sub 1 for a "him" and a Sub 2 for "her" if two people use the same mattress and require, need or prefer coils of different firmness for the same region, for example, the head region or the waist region of the mattress. In addition, the user may over time decide to exchange an existing insert if he decides that he would like more or less firmness after some time. Thus, the user can "upgrade" to more or less firm support by exchanging one or more inserts. Also, if there is a problem with a portion of the mattress, then inserts corresponding to that portion can be exchanged, repaired or replaced.

Although the present invention has been described in relation to particular embodiments thereof, many other variations and modifications, other combinations of features described, and other uses will become apparent to those skilled in the art. It is preferred, therefore, that the present invention be limited not by the specific disclosure herein.

What is claimed is:

1. A mattress including a wooden coil spring made of a slat of wood having, at a first point of the slat, a cross section with rectilinear major sides with a first value as a first dimension, and having, at a second point remote in the longitudinal direction of the slat from the first point, a cross section with rectilinear major sides with a second value as the first dimension, the first value being greater than the second value, wherein the coil spring is made of non-compressed wood.

2. The mattress of claim 1, wherein the coil spring has a cylindrical shape.

3. The mattress of claim 1, wherein the coil spring has a cone or truncated cone shape.

4. The mattress of claim 3, wherein the coil spring comprises at least three turns, each turn having a diameter smaller than an immediately adjacent turn.

5. The mattress of claim 1, wherein the coil spring has a longitudinal axis extending through a center of the coil spring, and an outer surface of the end turn facing away from any adjacent turn of the coil spring is substantially perpendicular, for at least 180 degrees of the end turn, to the longitudinal axis of the coil spring.

6. The mattress of claim 1, wherein the coil spring has a helical rise in a range of 3-45 degrees.

7. The mattress of claim 1, wherein the wooden coil springs comprise a wooden coil spring having an end turn with a smaller width than remaining turns of the wooden coil spring.

8. The mattress of claim 1, wherein the first dimension of the slat is measured radially with respect to the longitudinal axis of the coil spring.

9. The mattress of claim 1, wherein the first dimension of the slat is measured axially with respect to the longitudinal axis of the coil spring.

10. The mattress of claim 1, wherein the second point comprises a wood removed portion so as to create the second value of the first dimension.

11. The mattress of claim 1, wherein the first point comprises turns of the coil spring attached to each other so as to create the first value of the first dimension.

12. The mattress of claim 1, wherein the slat is made of at least one of beech wood, oak wood, cherry wood, or walnut wood.

13. The mattress of claim 1, wherein the slat is made of a nut tree wood.

14. A mattress including a wooden coil spring made of a slat of wood having, at a first point of the slat, a cross section with rectilinear major sides with a first value as a first dimension, and having, at a second point remote in the longitudinal direction of the slat from the first point, a cross section with rectilinear major sides with a second value as the first dimension, the first value being greater the second value, wherein the mattress further comprises:

a first plurality of wooden coil springs positioned in a first area of the mattress and a second plurality of wooden coil springs positioned in a second area of the mattress different from the first area, wherein the first plurality of wooden coil springs provides a firmness firmer than the second plurality of wooden coil springs, wherein the coil spring is made of non-compressed wood.

15. The mattress of claim 14, wherein each coil spring of the first plurality of wooden coil springs comprises:

(1) an end turn wider than end turns of the coil springs of the second plurality of wooden coil springs, and (2) remaining turns having substantially the same widths as the remaining turns of the second plurality of wooden coil springs.

16. The mattress of claim 14, wherein the first plurality of wooden coil springs comprises coil springs each with a course of compression shorter than the course of compression of each of the coil springs of the second plurality of wooden coil springs.

17. The mattress of claim 14, wherein the first plurality of wooden coil springs comprises coil springs shorter than coil springs of the second plurality of wooden coil springs.

18. A mattress including a wooden coil spring made of a slat of wood having, at a first point of the slat, a cross section with rectilinear major sides with a first value as a first dimension, and having, at a second point remote in the longitudinal direction of the slat from the first point, a cross section with rectilinear major sides with a second value as the first dimension, the first value being greater the second value, wherein the coil spring has a cylindrical shape, and wherein the wooden coil spring comprises:

(1) an end turn wider than an end turn of a second coil spring in the mattress, and (2) remaining turns having substantially the same widths as the remaining turns of the second wooden coil spring, wherein the coil spring is made of non-compressed wood.

* * * * *